Figure 8:
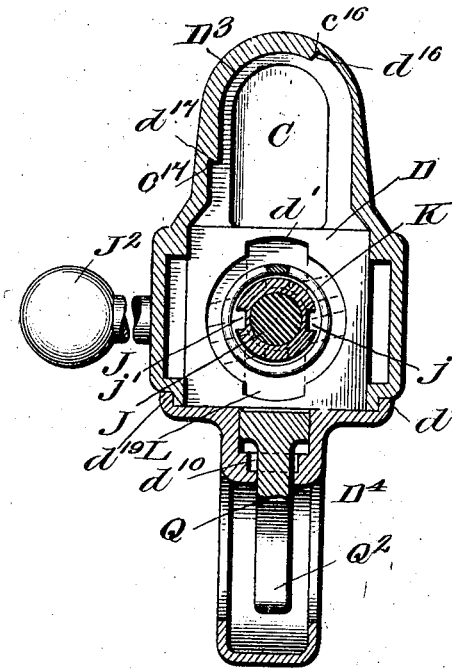

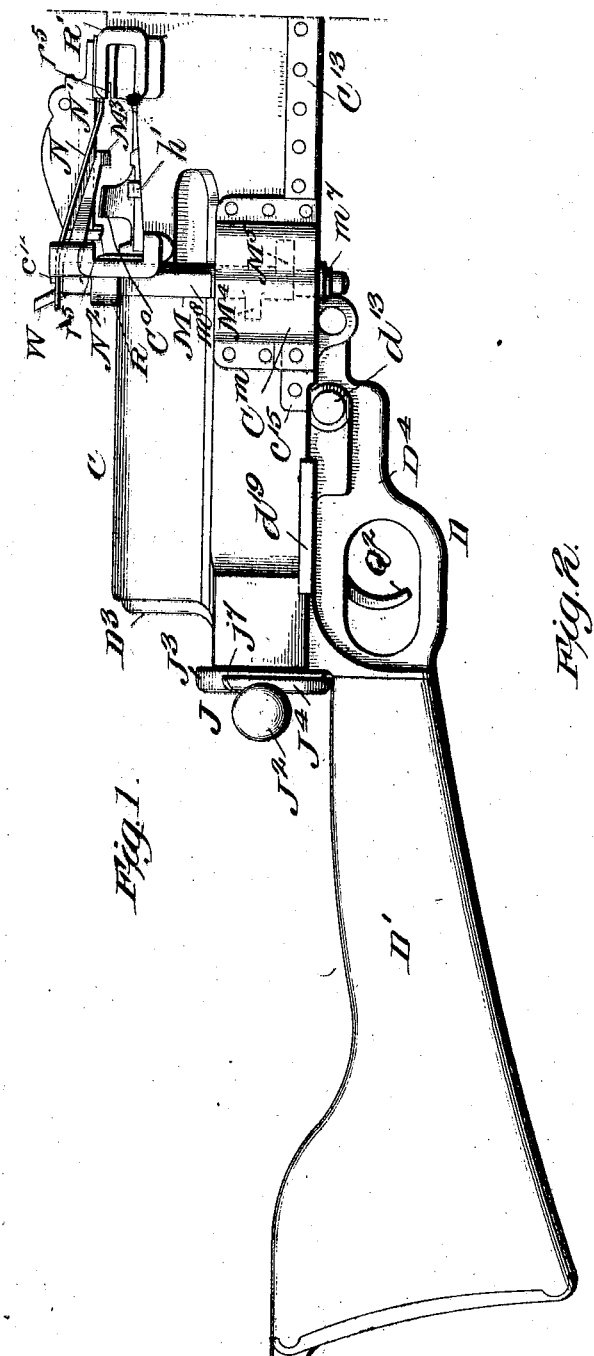
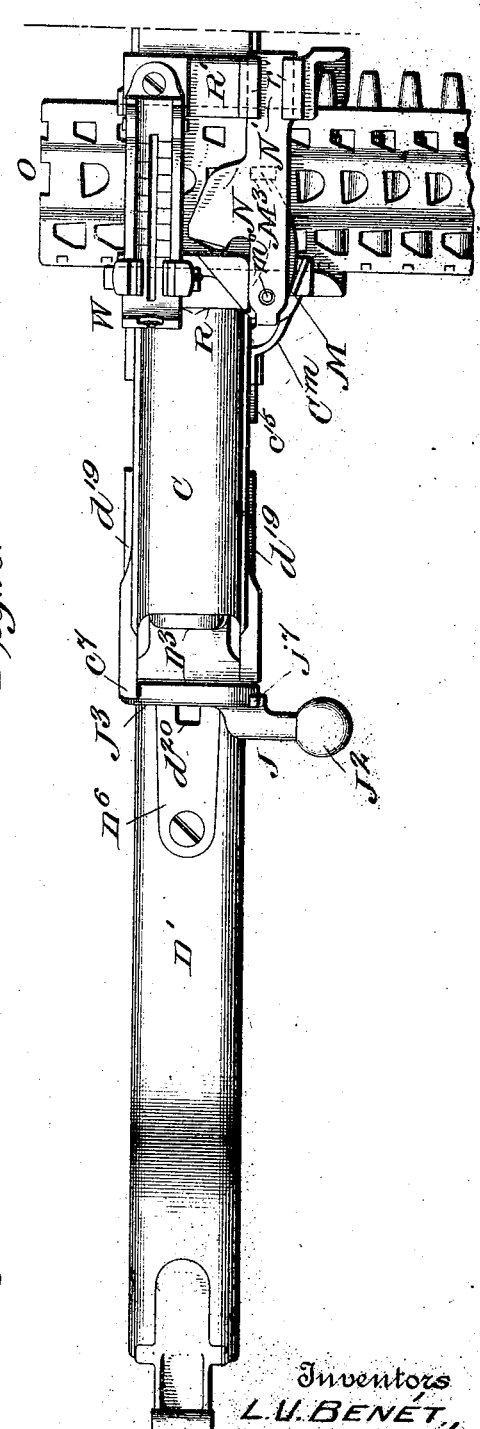

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 2.
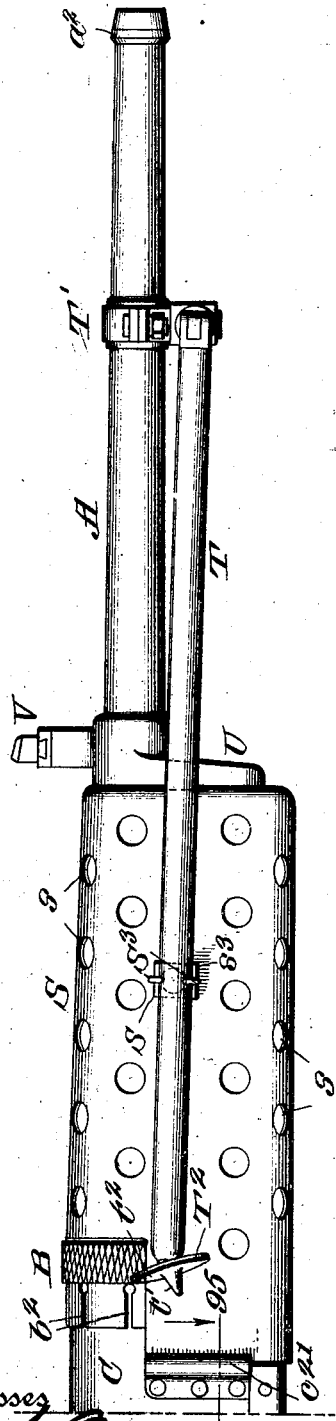
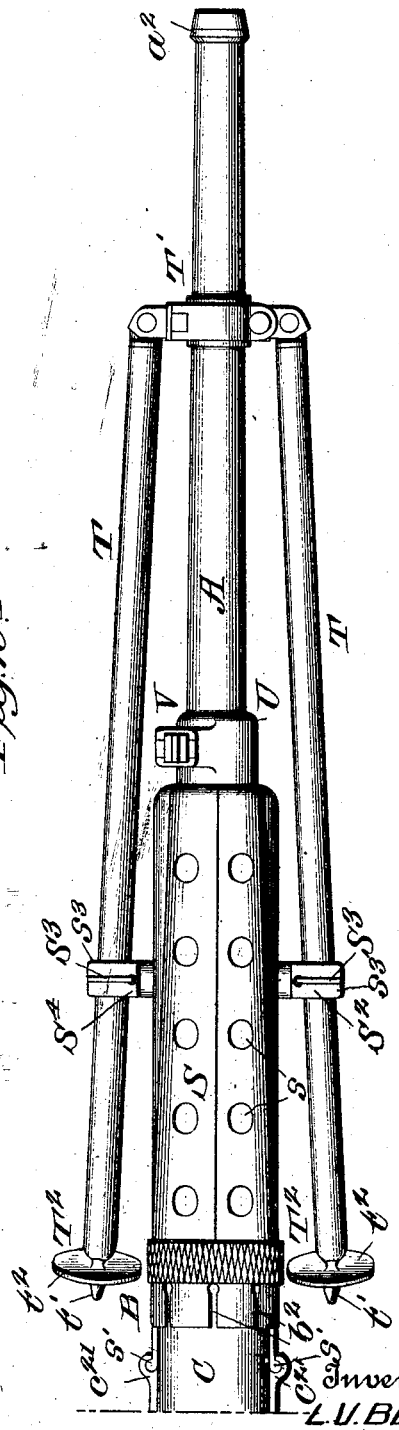

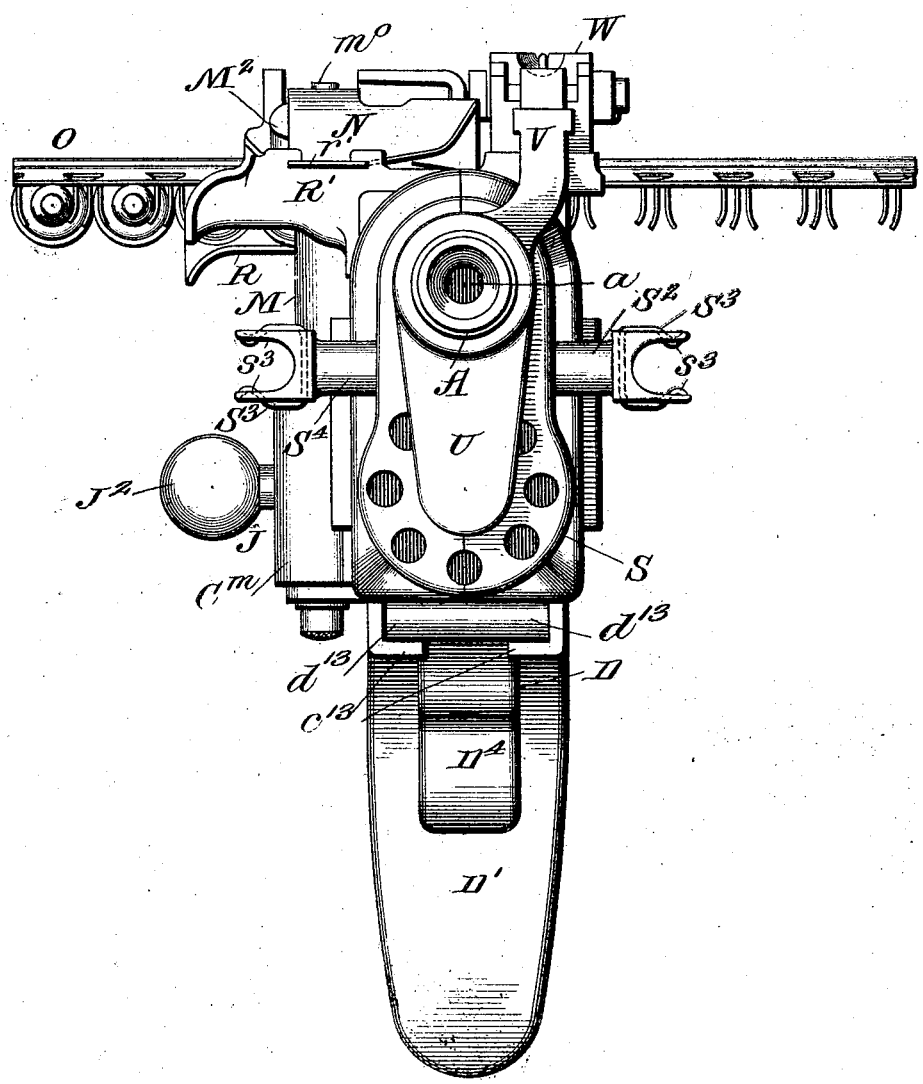

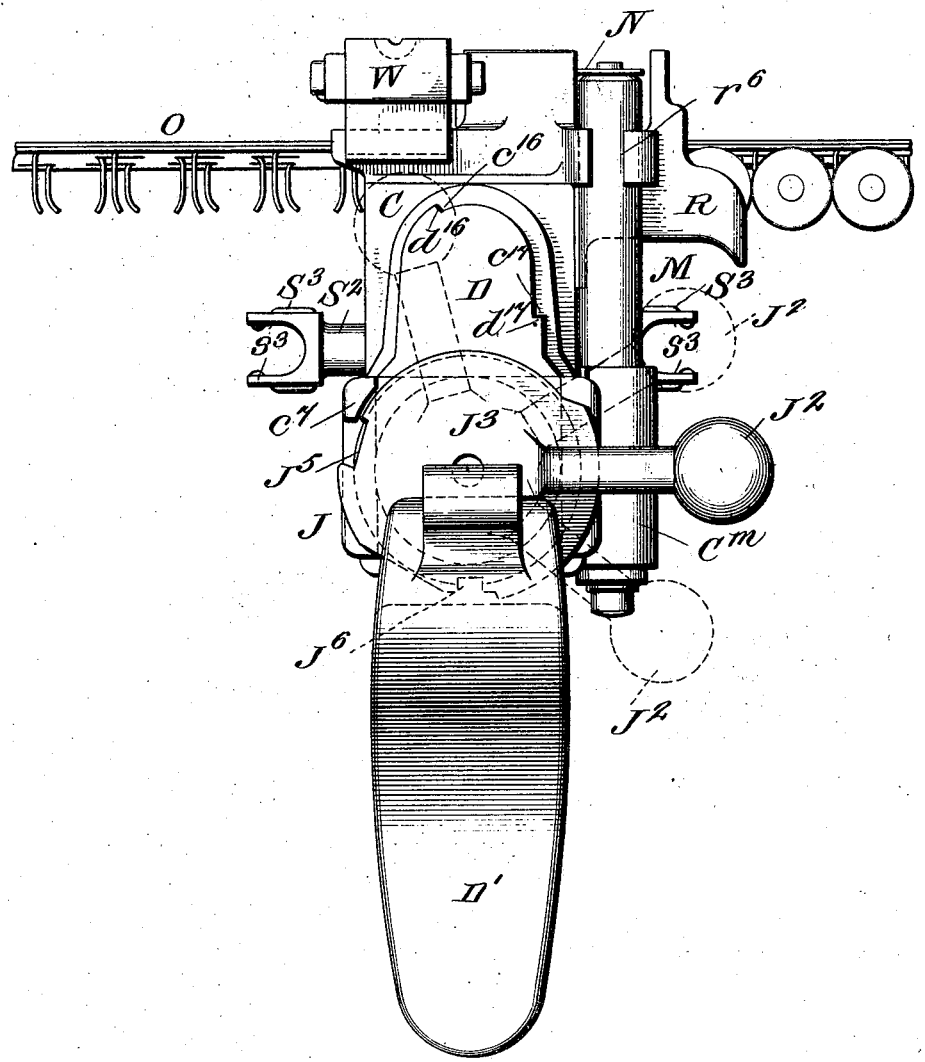

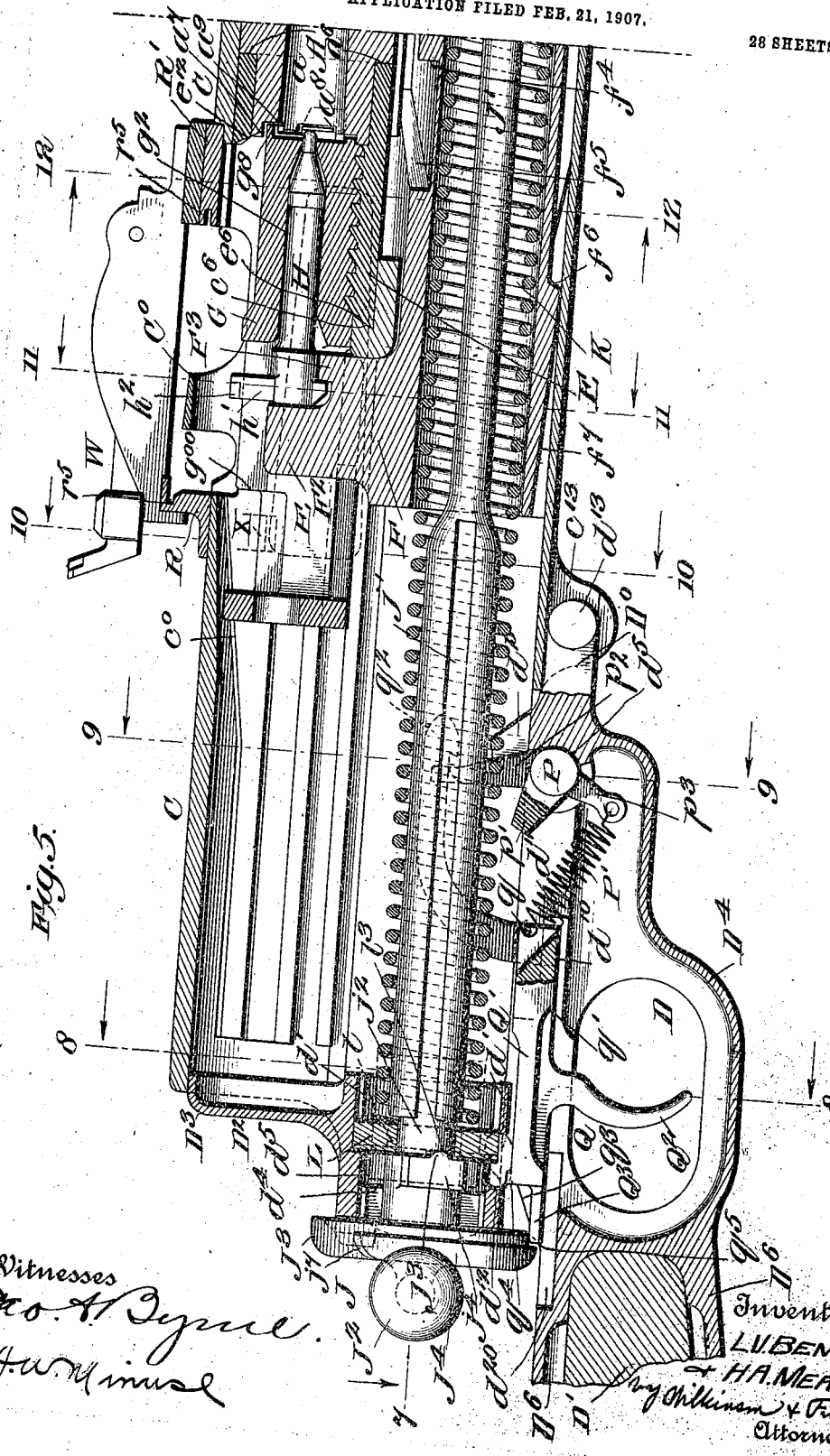

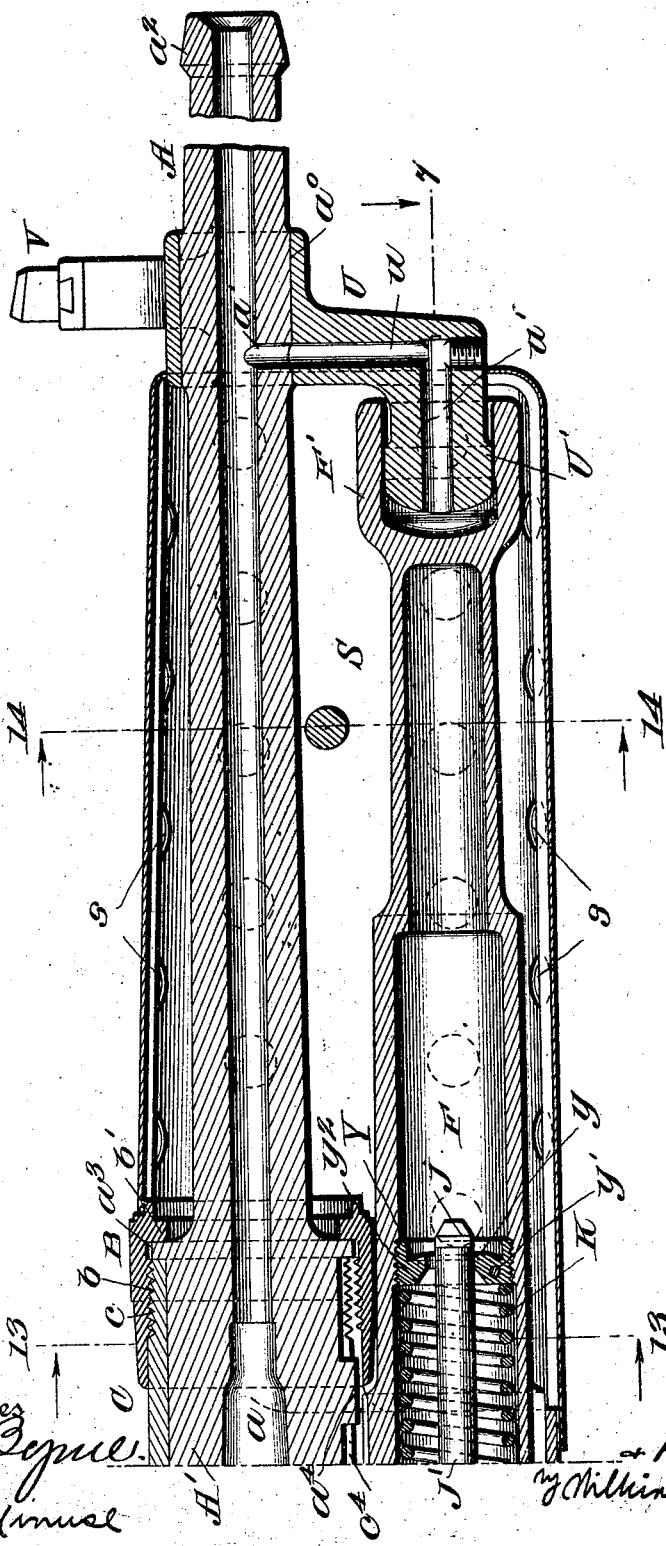

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 7.
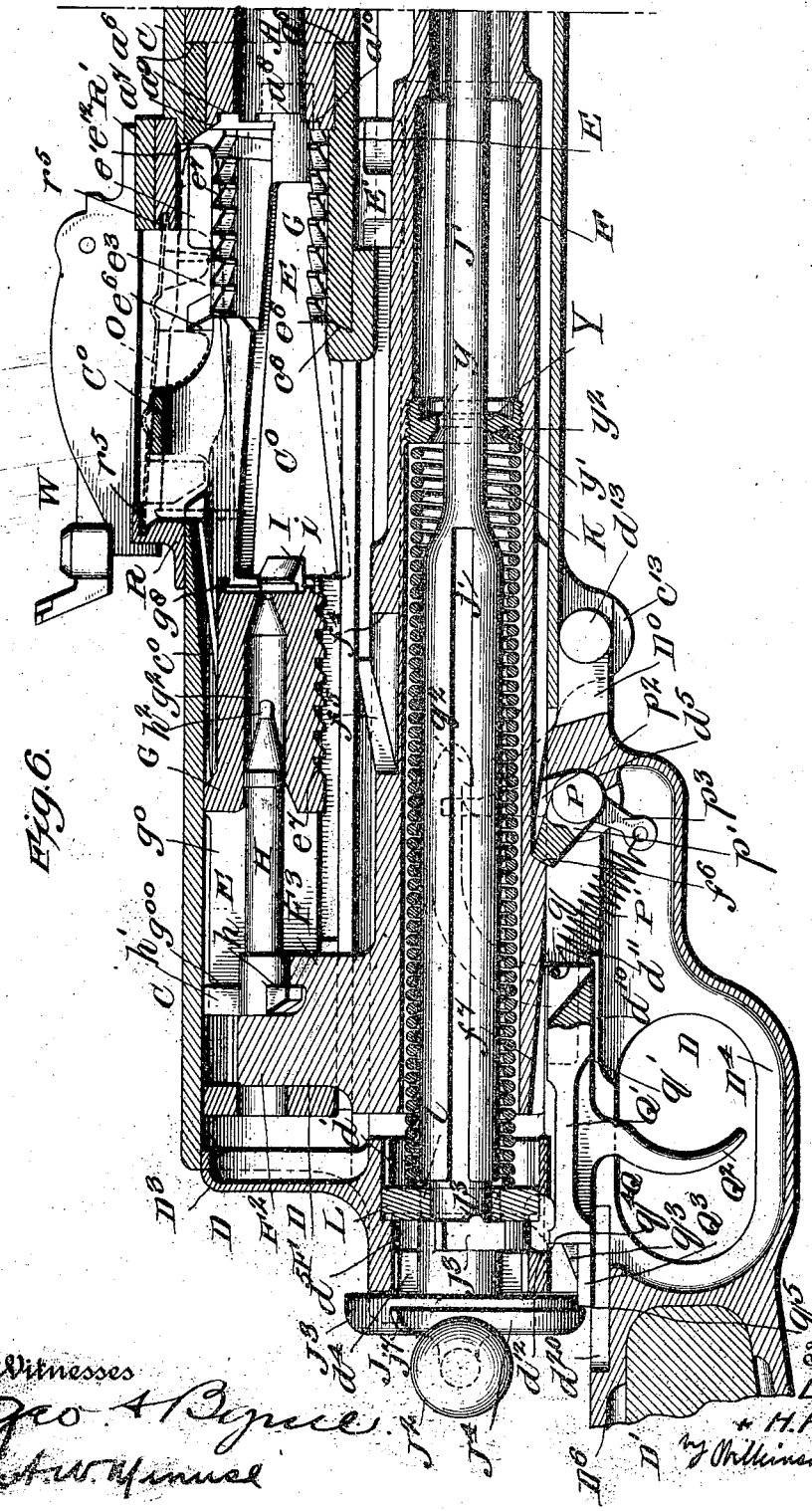
Witnesses
Inventors,
L. V. BENÉT,
H. A. MERCIÉ,
Attorneys

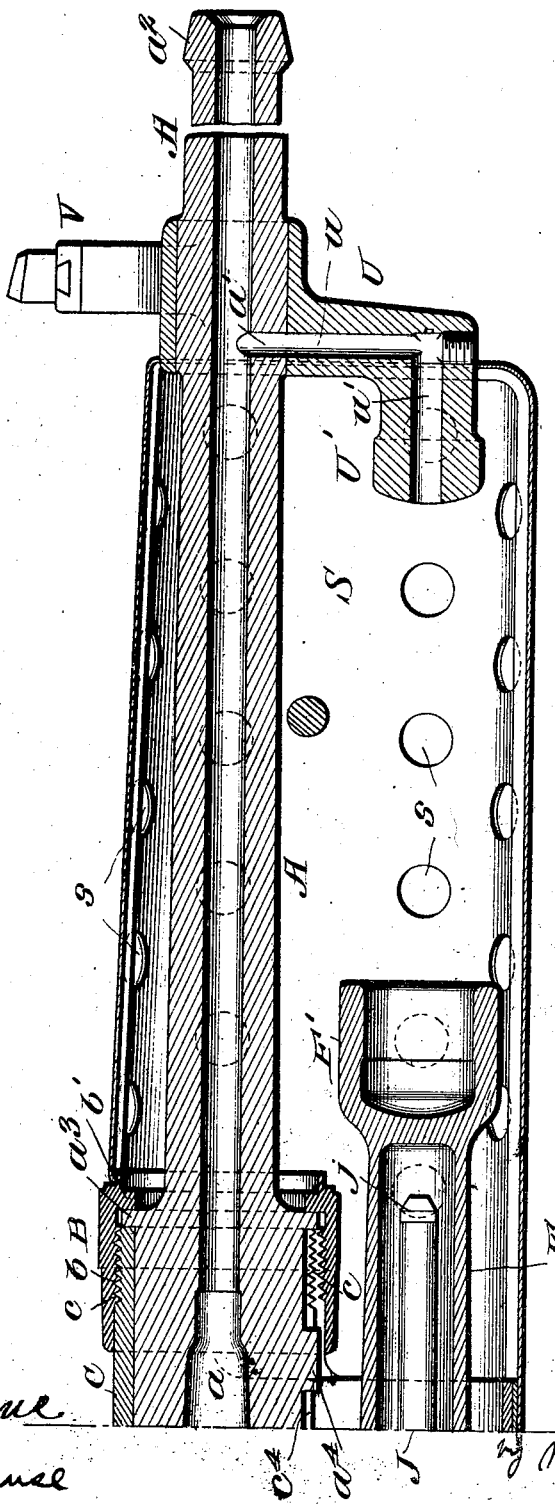

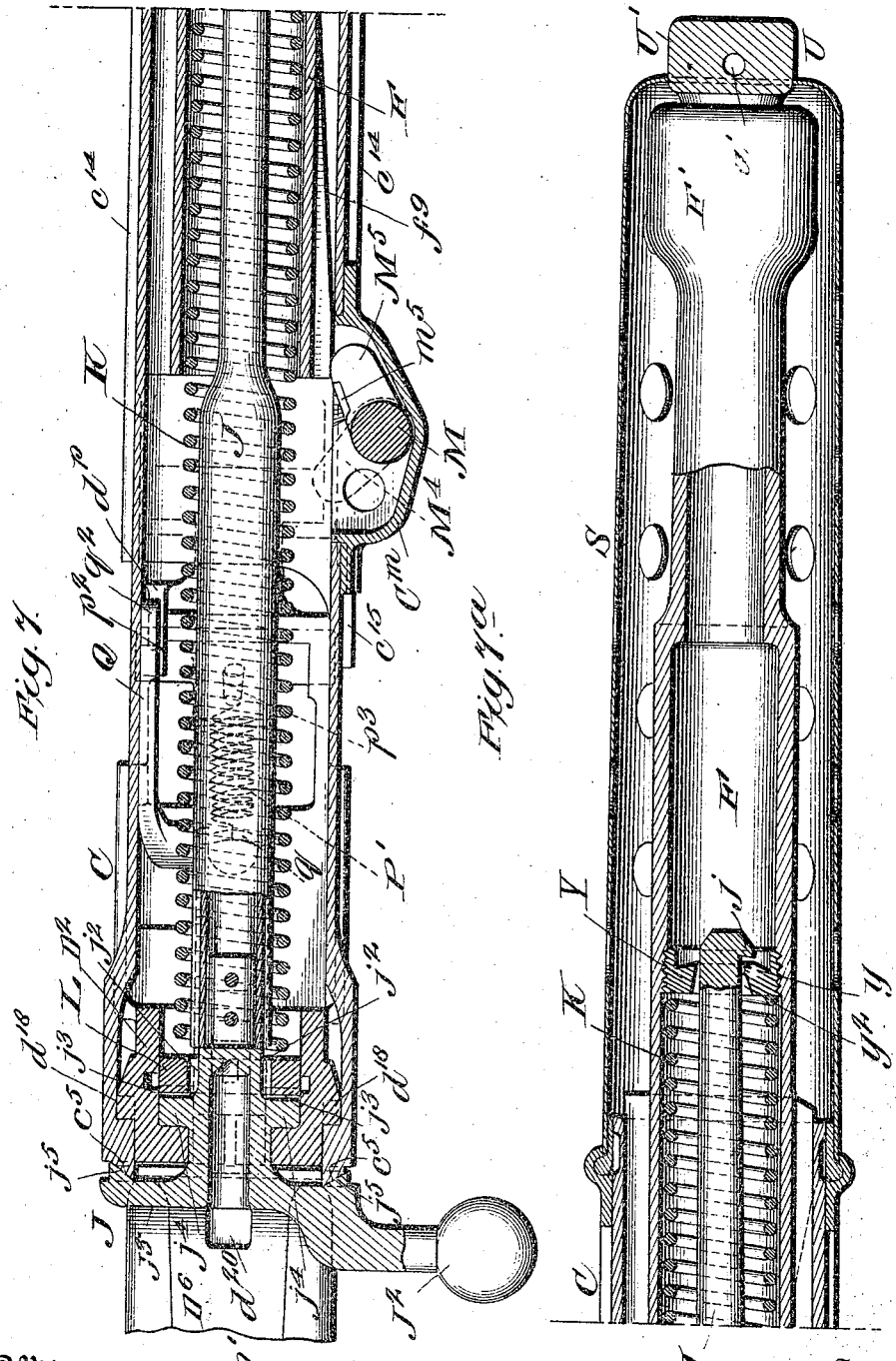

No. 861,939. PATENTED JULY 30, 1907.
L. V. BENÉT & H. A. MERCIÉ.
GAS OPERATED GUN.
APPLICATION FILED FEB. 21, 1907.

28 SHEETS—SHEET 10.

Witnesses
Inventors
L. V. BENÉT,
& H. A. MERCIÉ,
Attorneys.

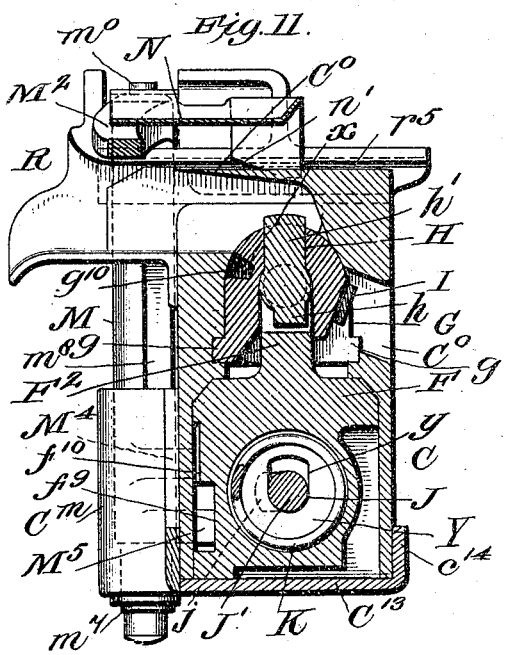
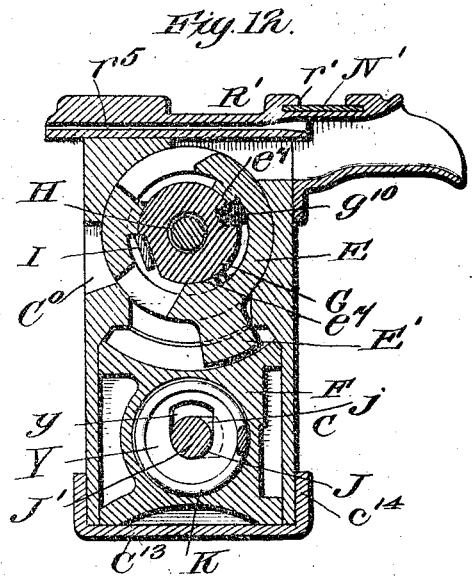
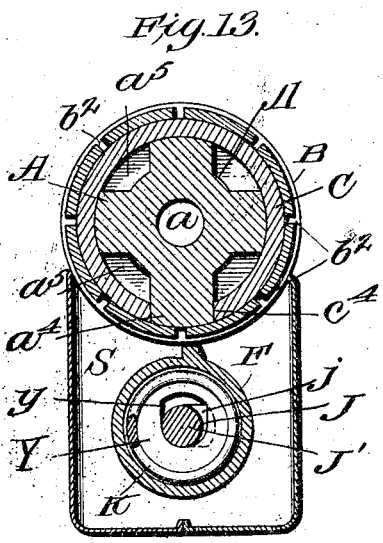
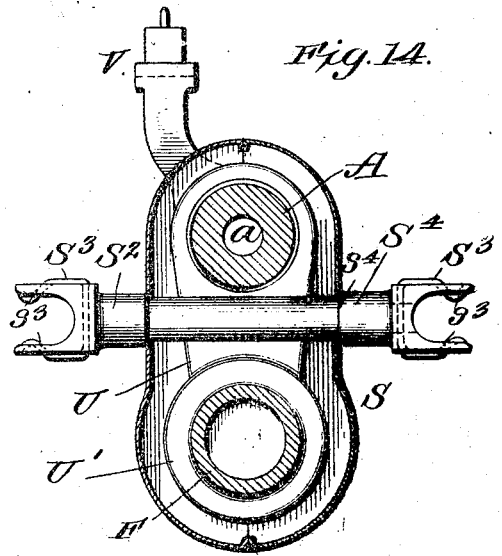

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 12.
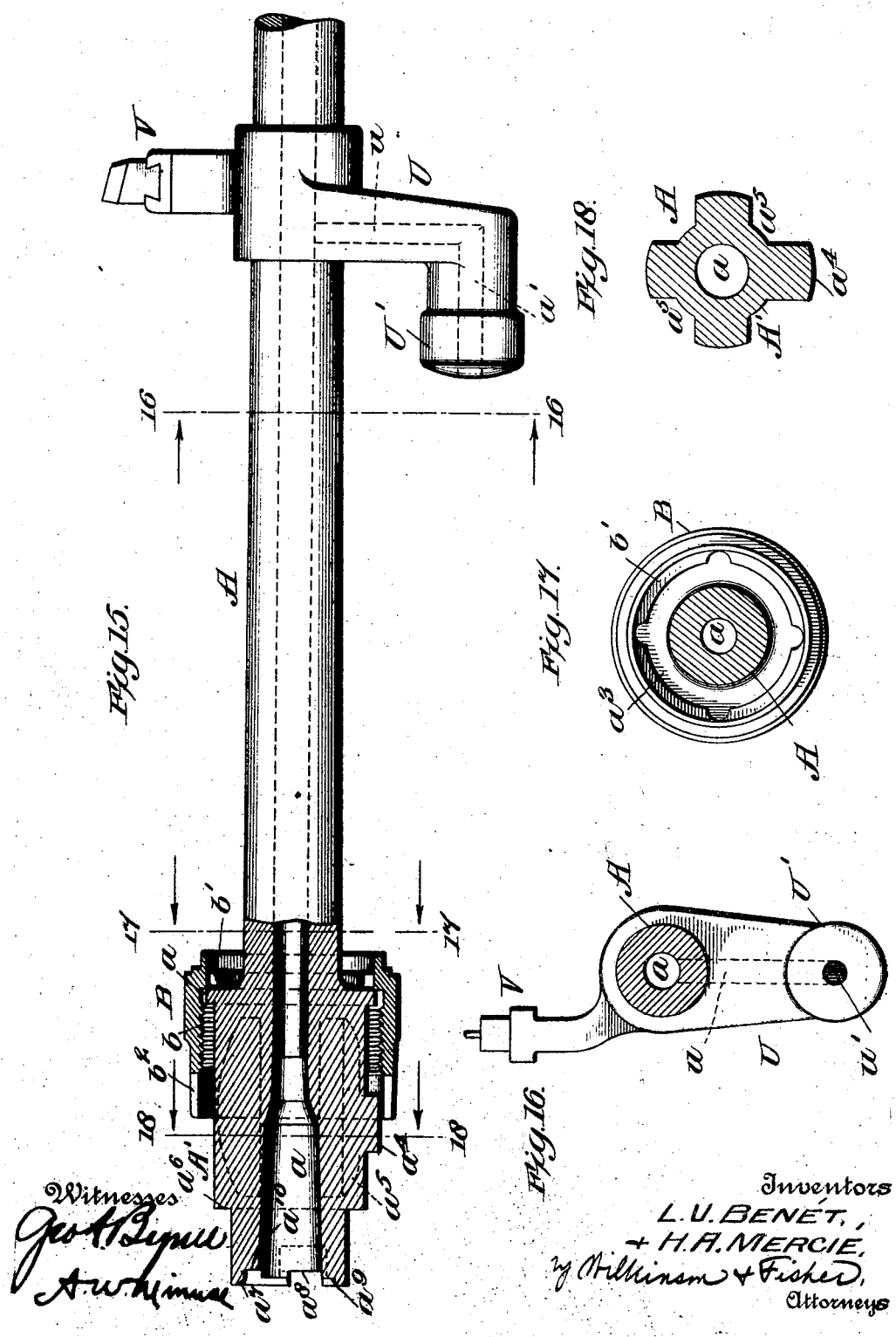

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 13.
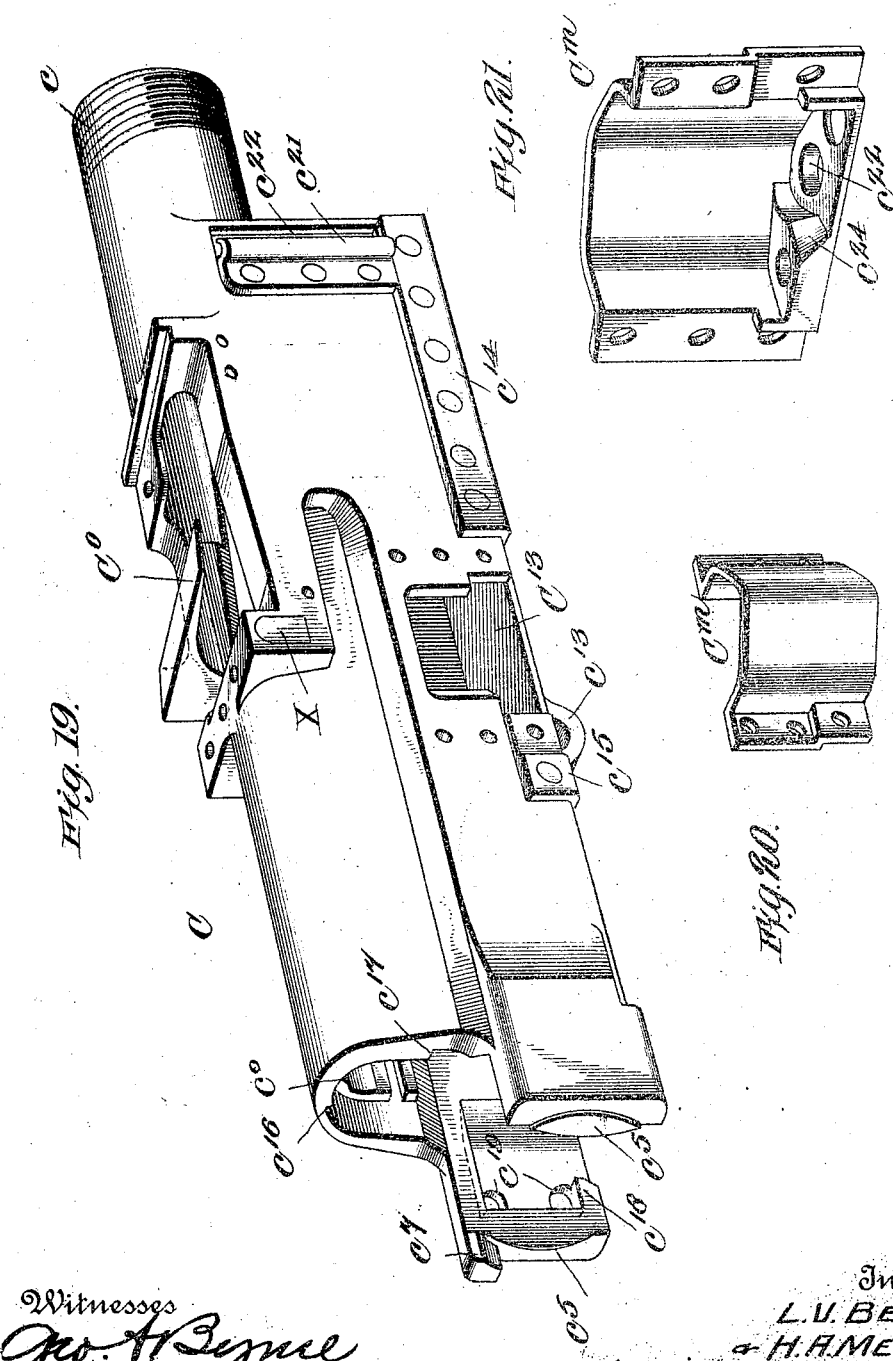

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 14.
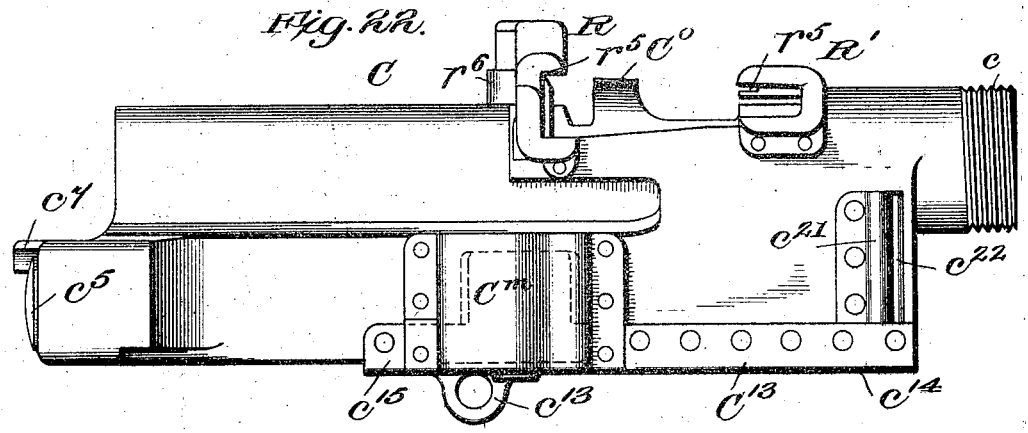
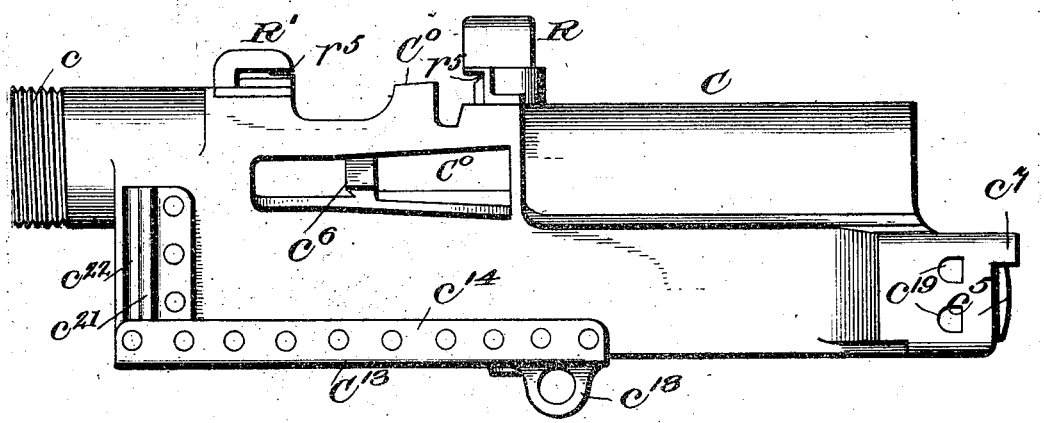
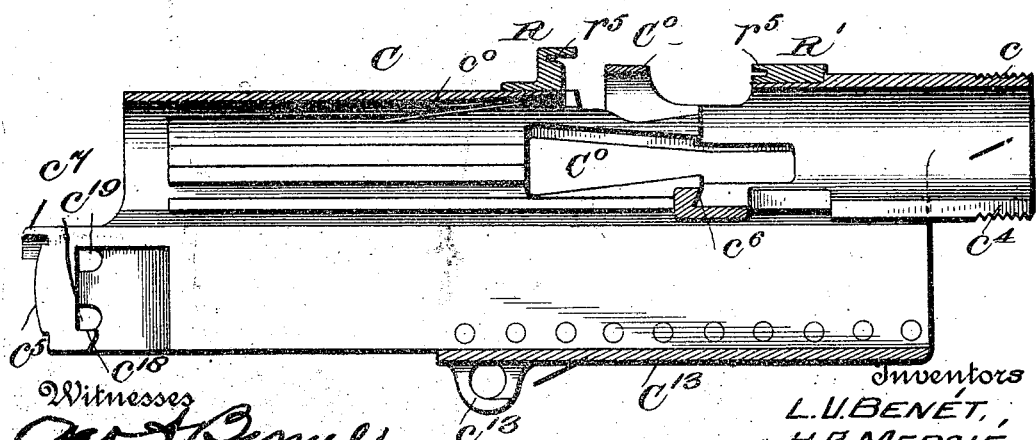

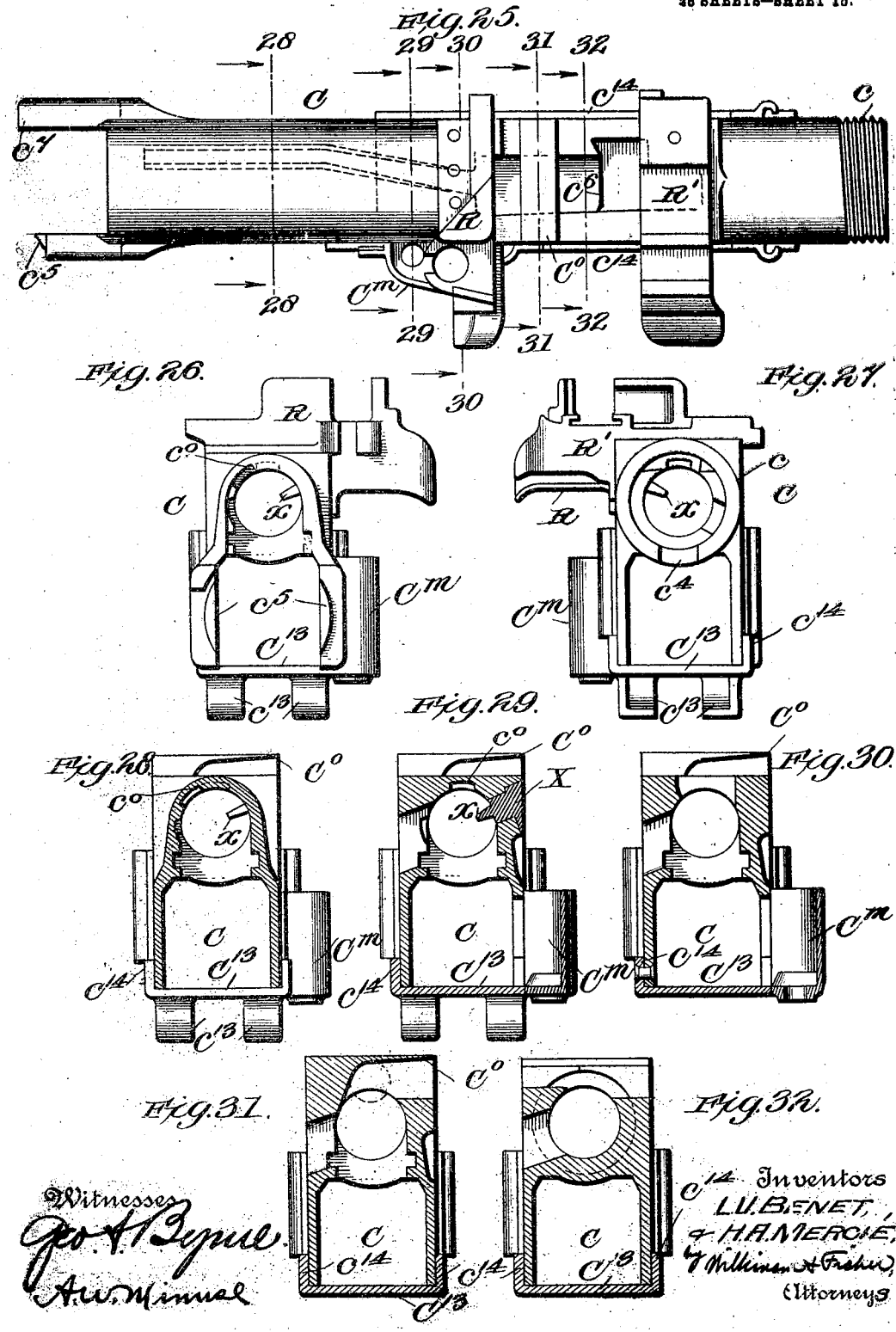

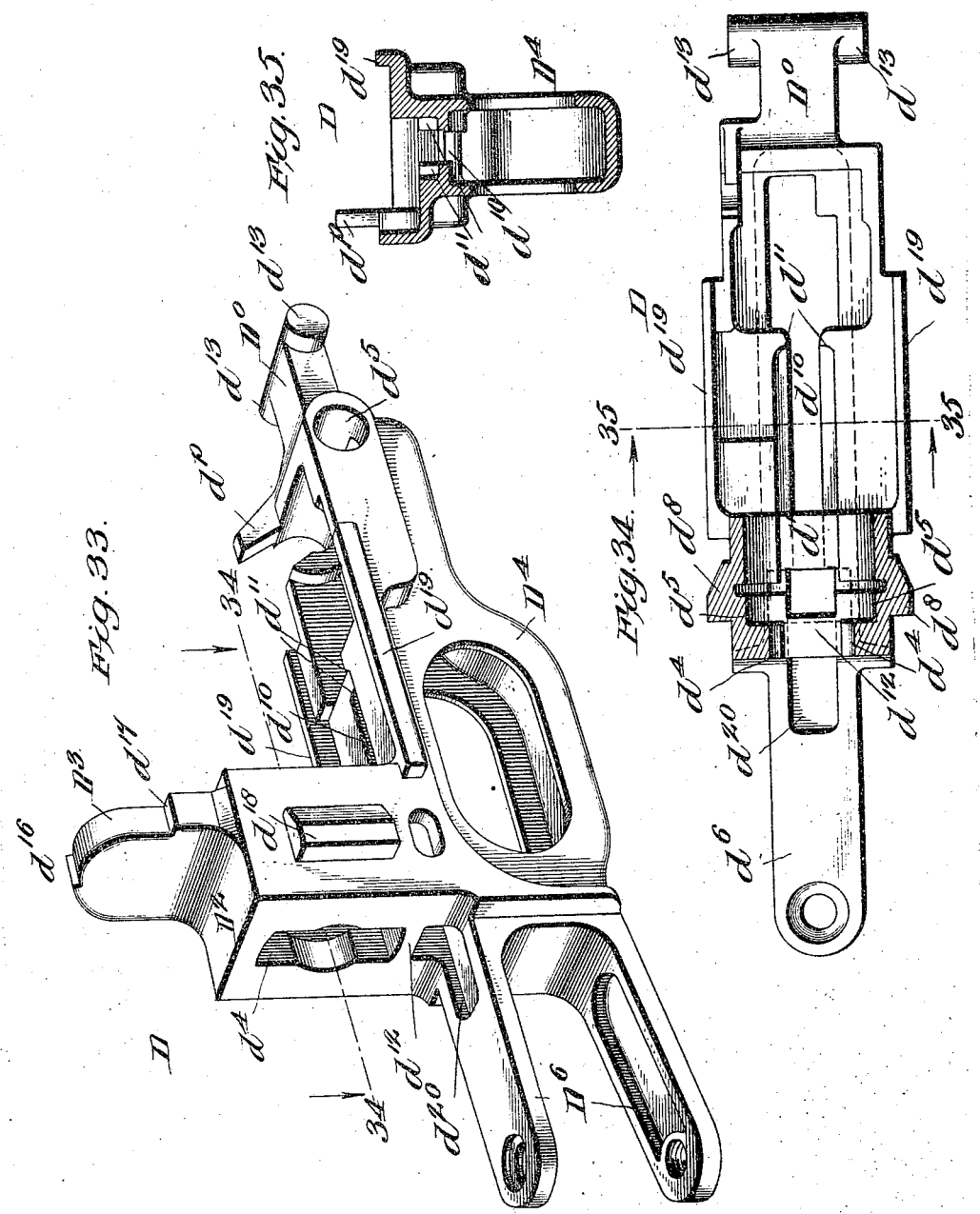

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 17.
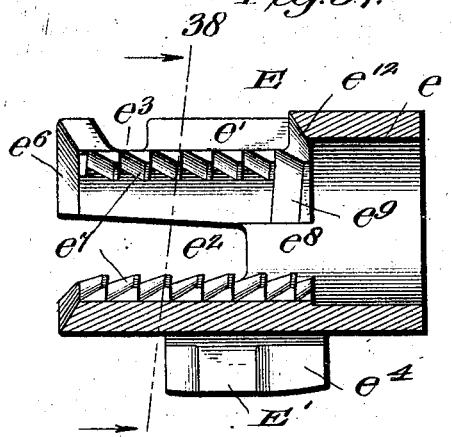
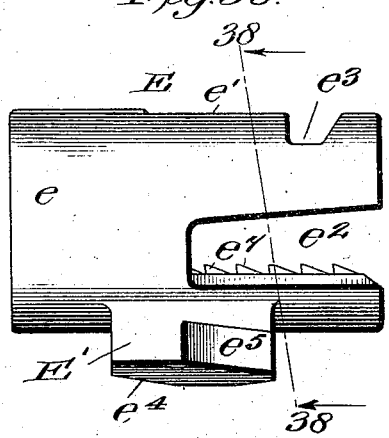
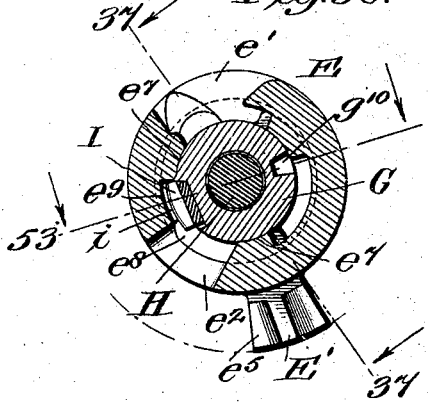
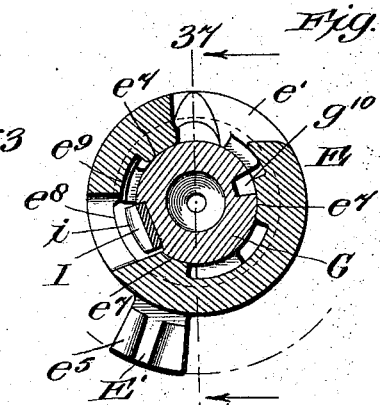
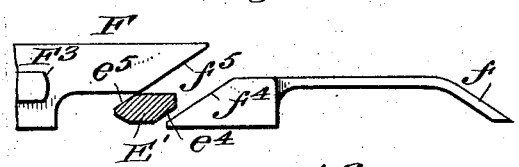
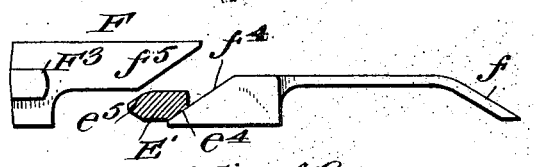
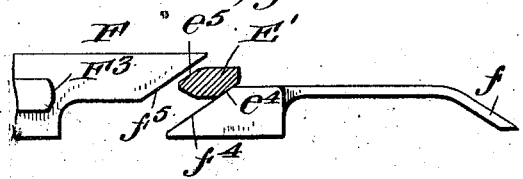
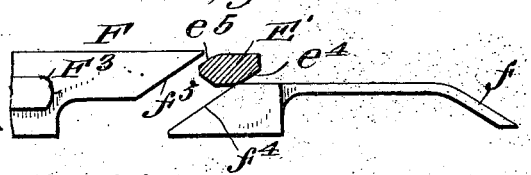
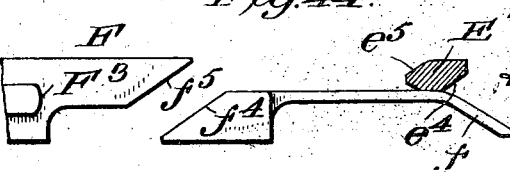
Witnesses
Inventors
L. V. BENÉT,
& H. A. MERCIÉ,
Attorneys.

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 19.
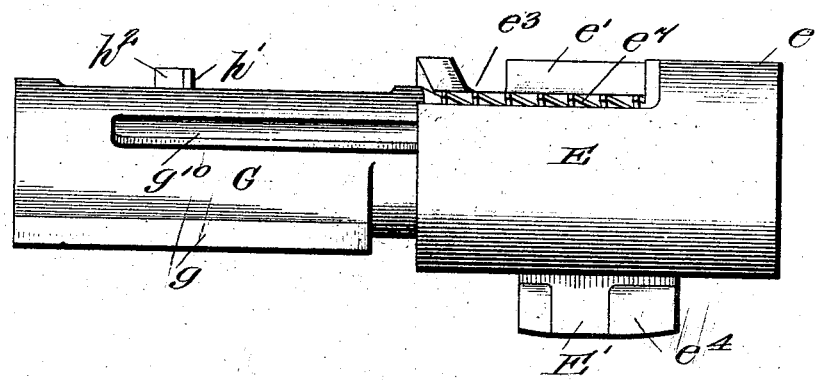
Fig. 51.
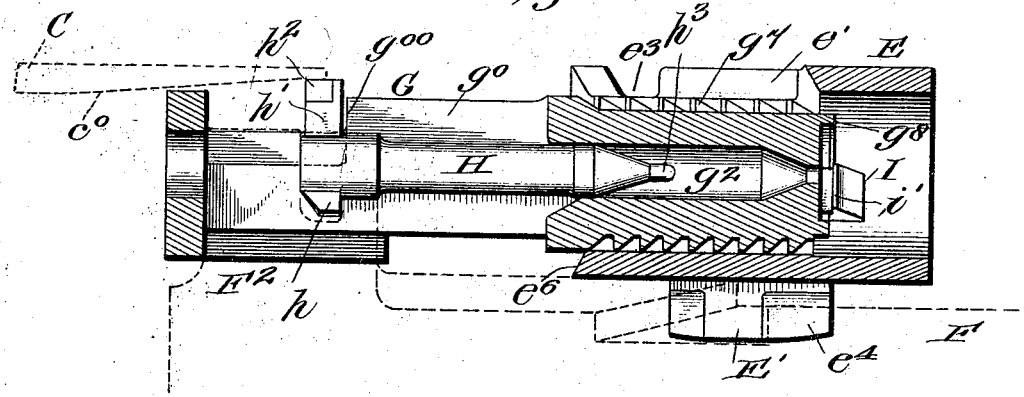
Fig. 52.
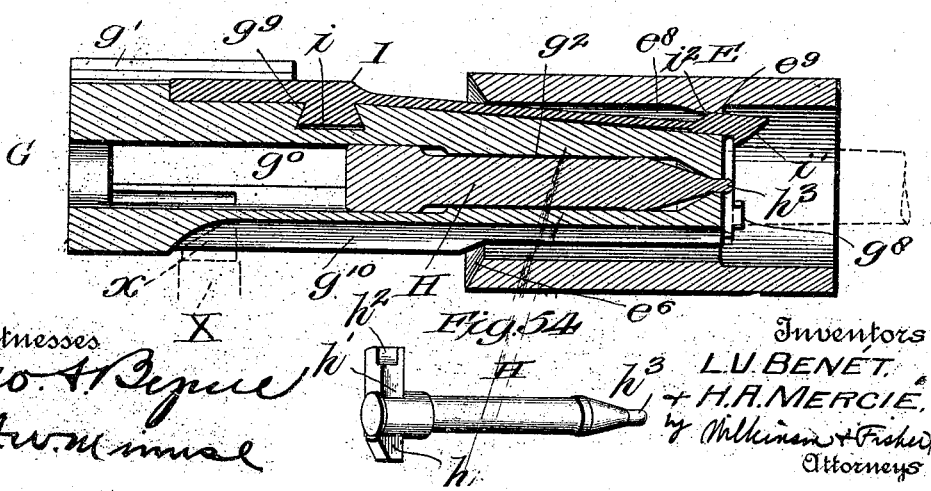
Fig. 53.
Fig. 54.
Witnesses
Inventors
L.V. BENÉT.
H. A. MERCIÉ.
Attorneys

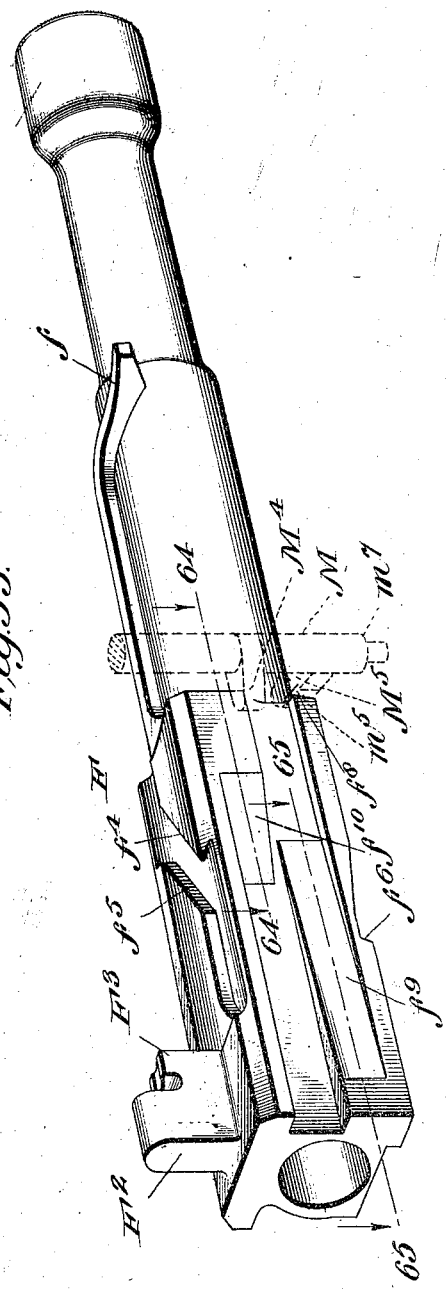
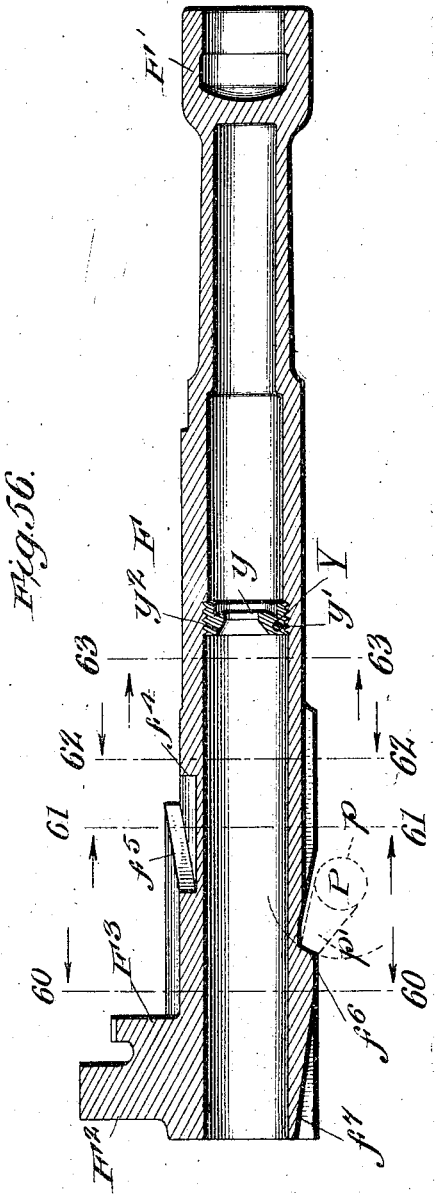

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 21.
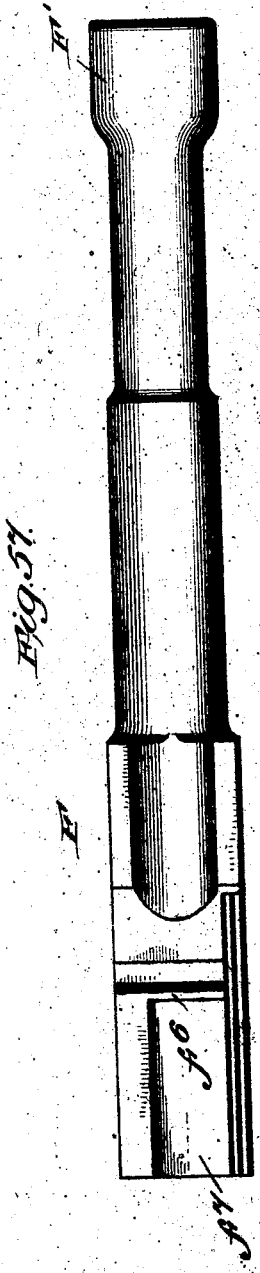
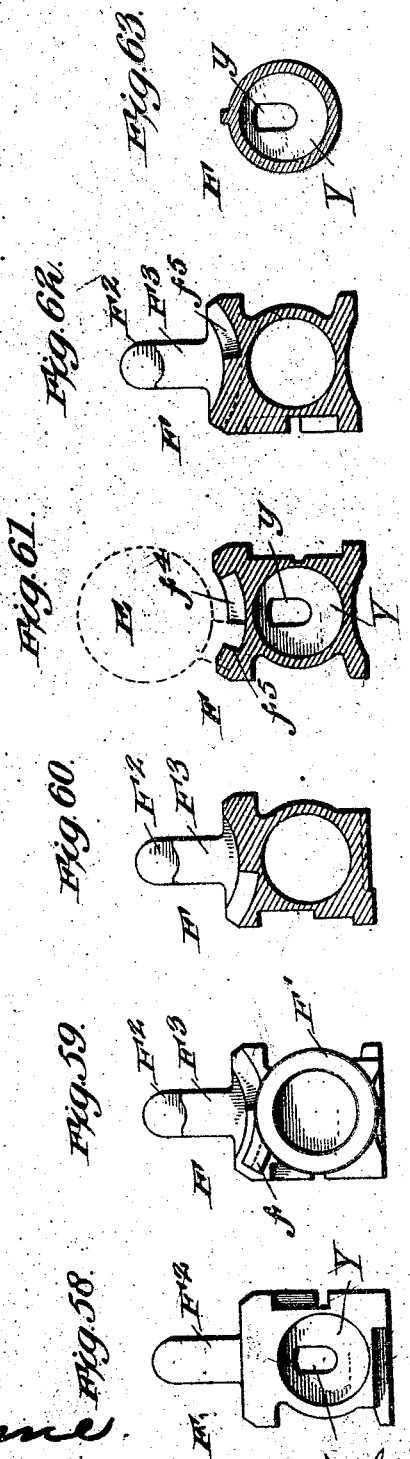
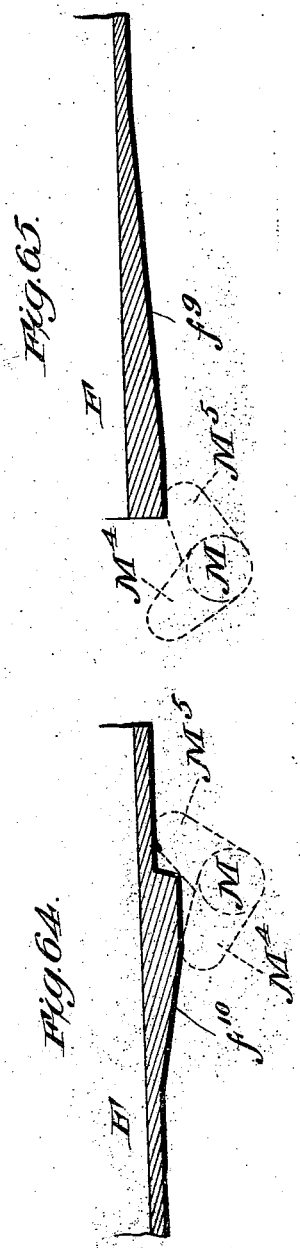
Witnesses
Inventors
L. V. BENÉT,
H. A. MERCIÉ,
by Wilkinson & Fisher,
Attorneys.

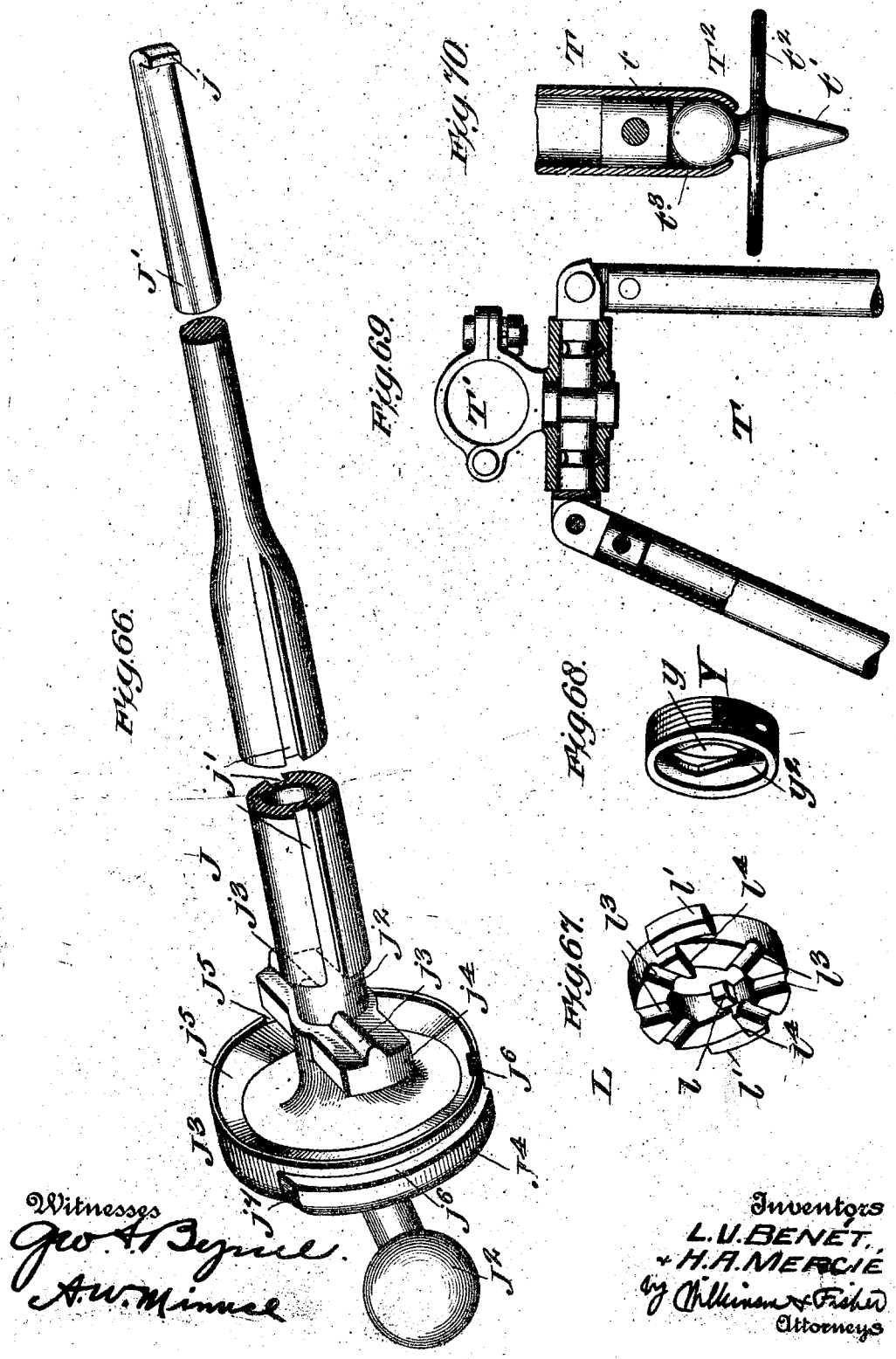

No. 861,939.　　　　　　　　　　　　　PATENTED JULY 30, 1907.
L. V. BENÉT & H. A. MERCIÉ.
GAS OPERATED GUN.
APPLICATION FILED FEB. 21, 1907.　　　28 SHEETS—SHEET 23.
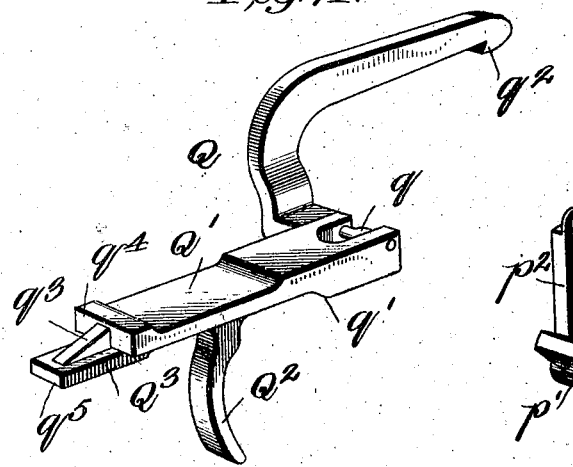
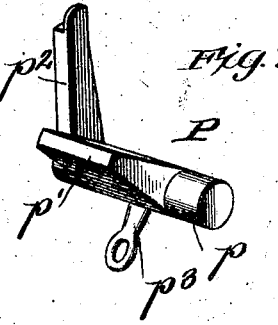
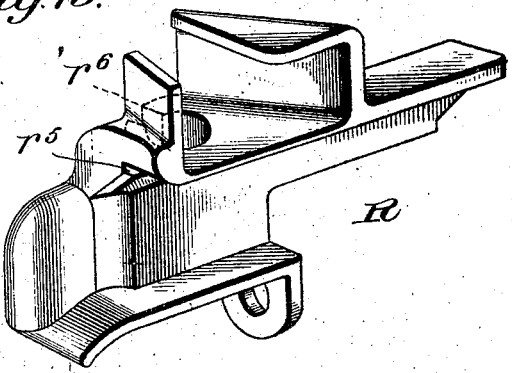
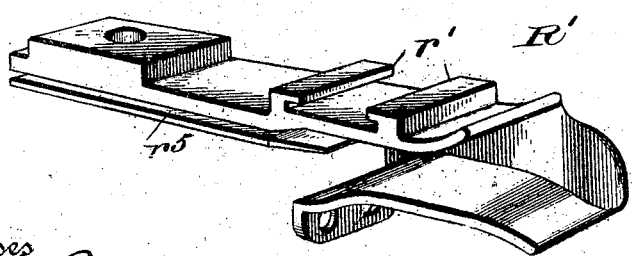

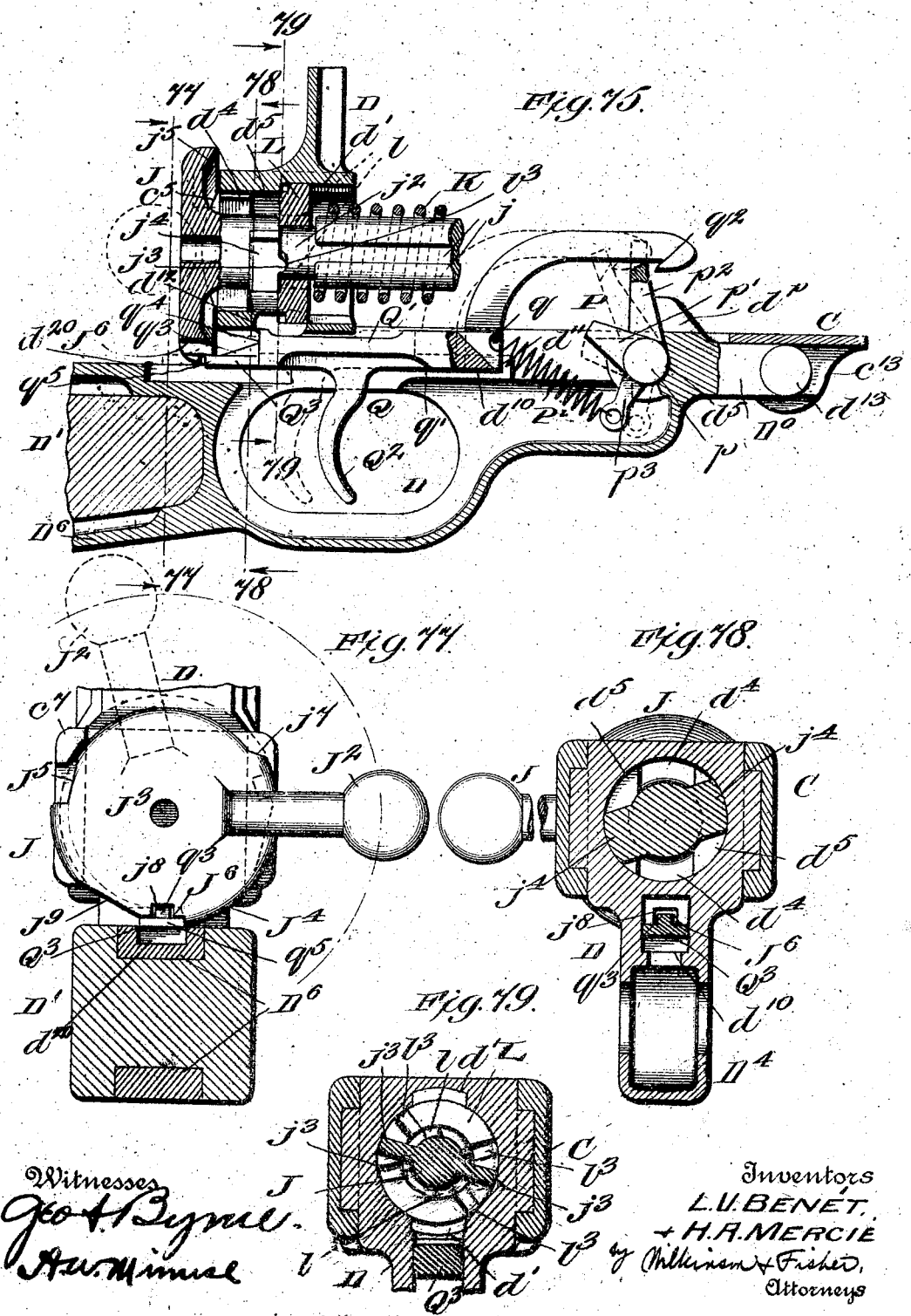

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 25.
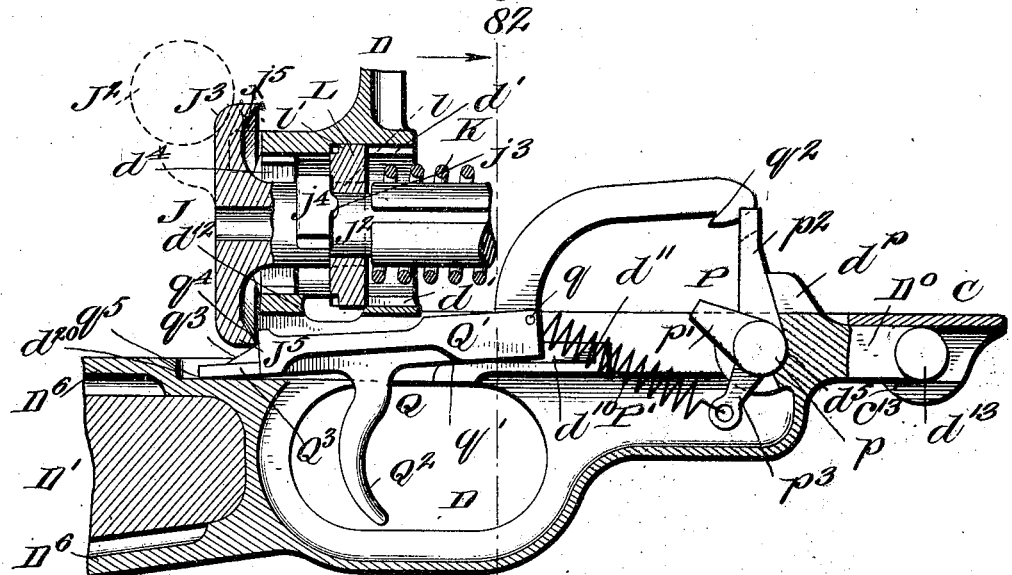
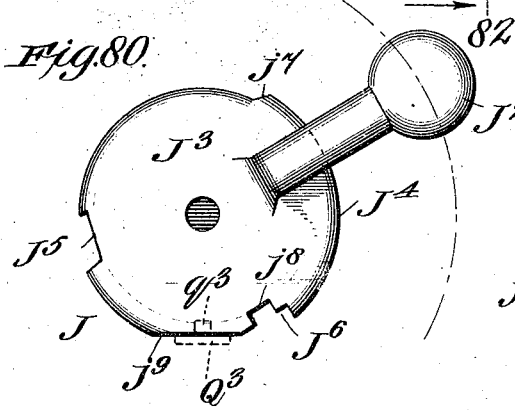
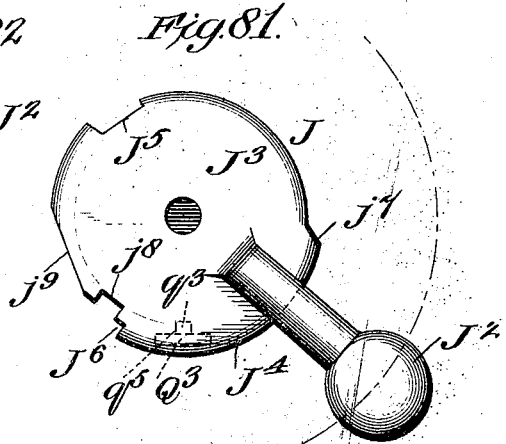
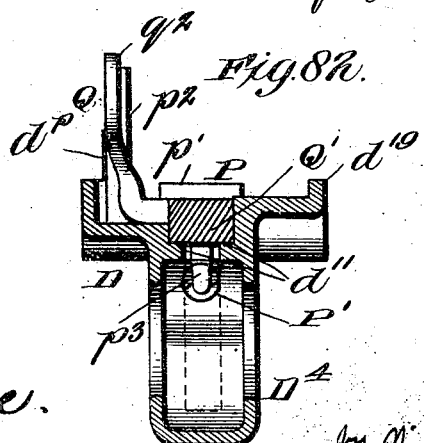
Witnesses
Inventors
L. V. BENÉT,
H. A. MERCIÉ,
Attorneys No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 26.
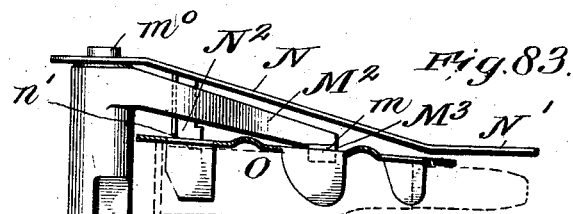
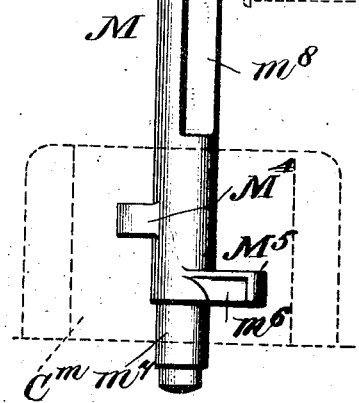
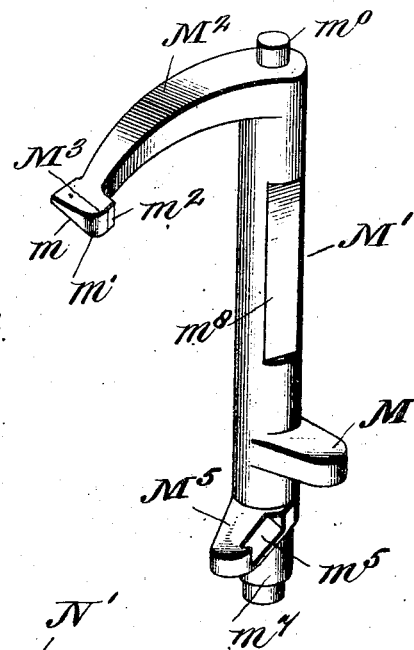
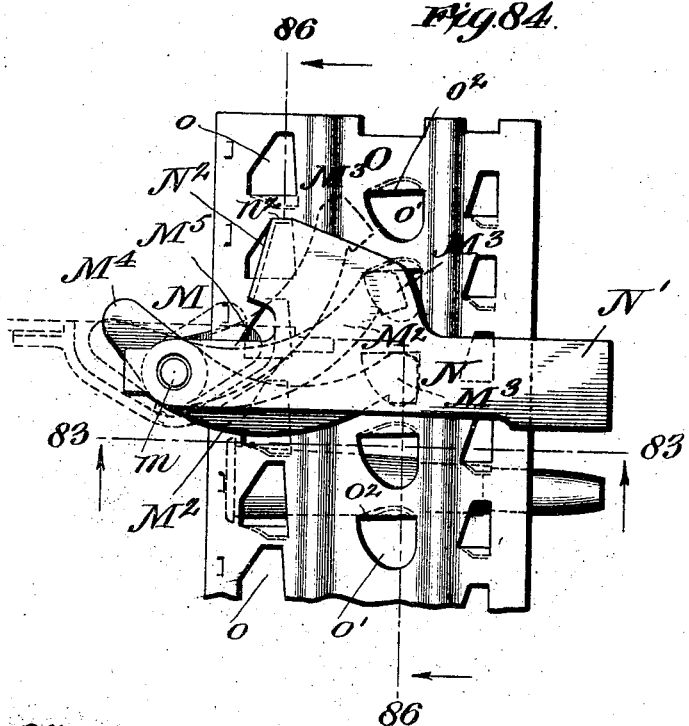

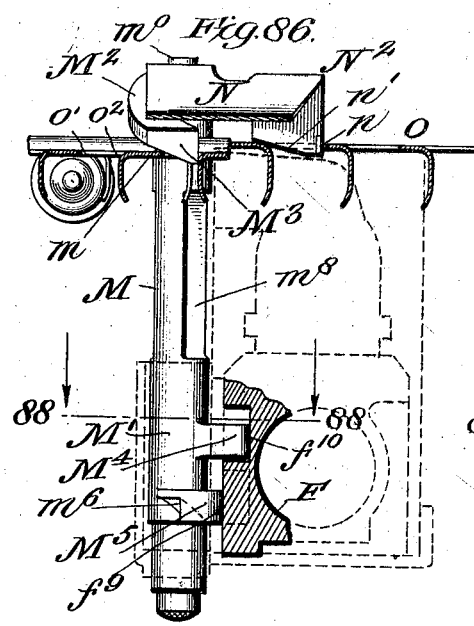
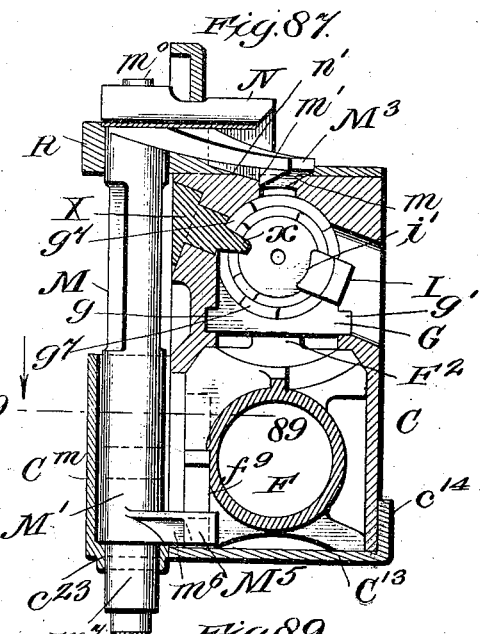
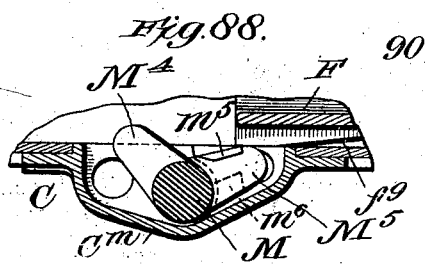
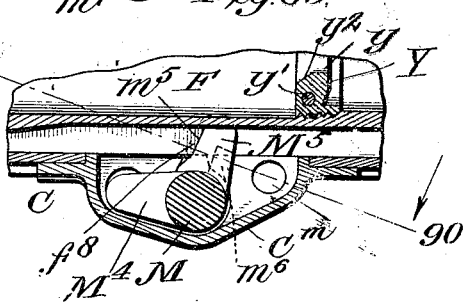
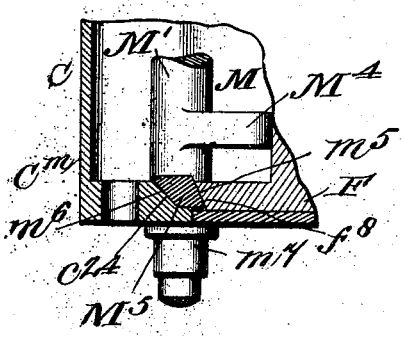
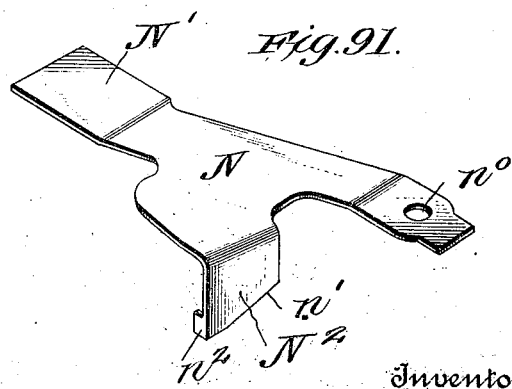

No. 861,939. PATENTED JULY 30, 1907.
L. V. BENÉT & H. A. MERCIÉ.
GAS OPERATED GUN.
APPLICATION FILED FEB. 21, 1907.
28 SHEETS—SHEET 28.
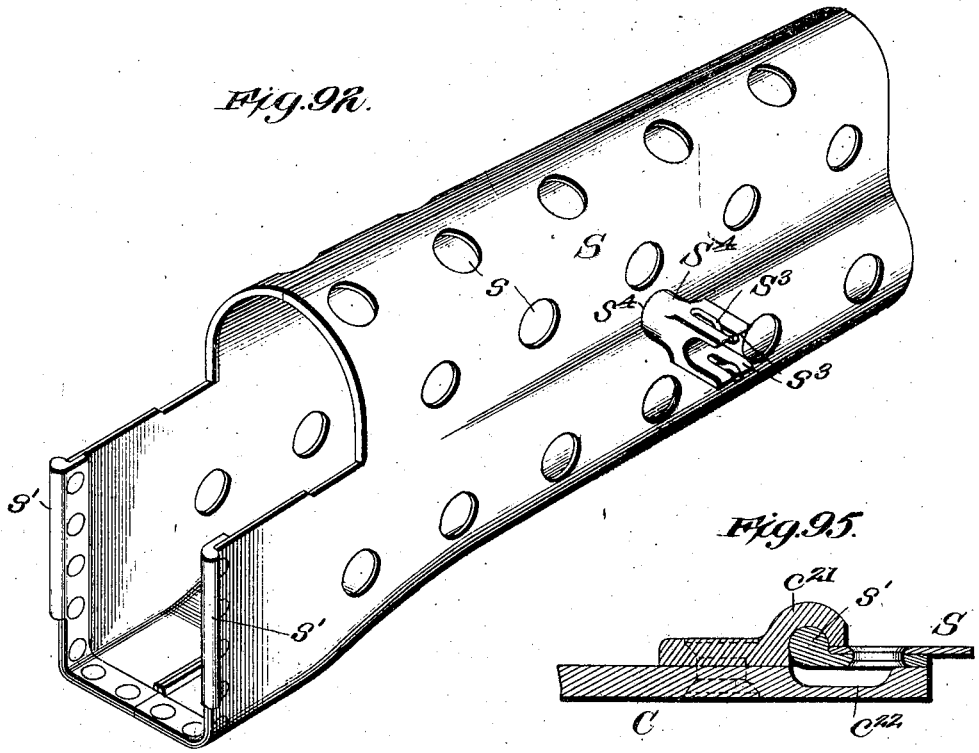
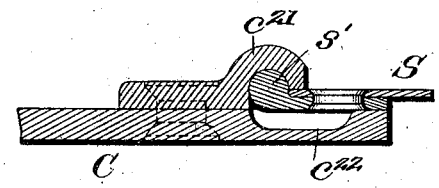
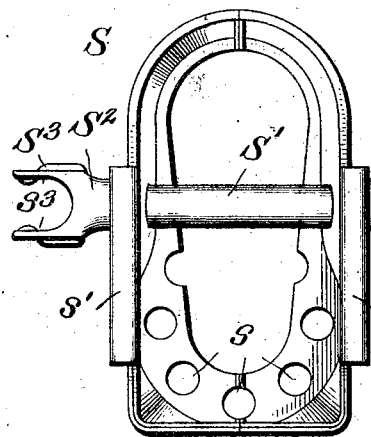
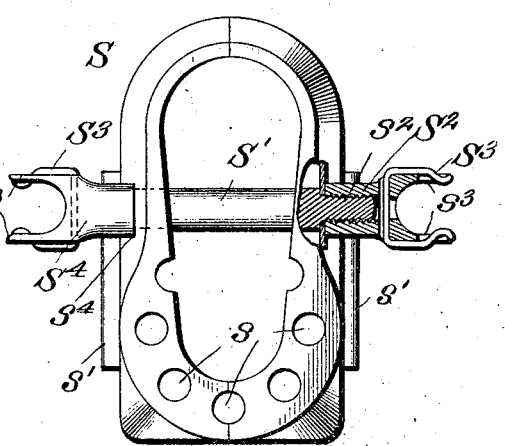
Witnesses
Inventors
L.V. BENÉT,
+ H.A. MERCIÉ,
by Wilkinson & Fisher,
Attorneys.

UNITED STATES PATENT OFFICE.

LAURENCE V. BENÉT AND HENRI A. MERCIÉ, OF PARIS, FRANCE.

GAS-OPERATED GUN.

No. 861,939.      Specification of Letters Patent.      Patented July 30, 1907.

Application filed February 21, 1907. Serial No. 358,571.

*To all whom it may concern:*

Be it known that we, LAURENCE V. BENÉT, a citizen of the United States, and HENRI A. MERCIÉ, a citizen of the French Republic, both residing at Paris, France, have invented certain new and useful Improvements in Gas-Operated Guns; and we do hereby declare the following to be a full, clear, and exact description of the invention, such as will enable others skilled in the art to which it appertains, to make and use the same.

Our present invention relates to improvements in gas operated guns, and it consists in an improved breech closure, improved firing mechanism, and also in improved feed mechanism, and cartridge extracting mechanism, which various parts all combine in the operation of the gun.

Furthermore, the invention relates to an improved construction of the various parts so that they may be readily assembled and dismounted, without the use of special tools.

The invention also relates to certain improved combinations and arrangements of parts, all of which will be best understood by reference to the accompanying drawings, in which the same parts are indicated by the same letters and numerals throughout the several views.

Figure 9:
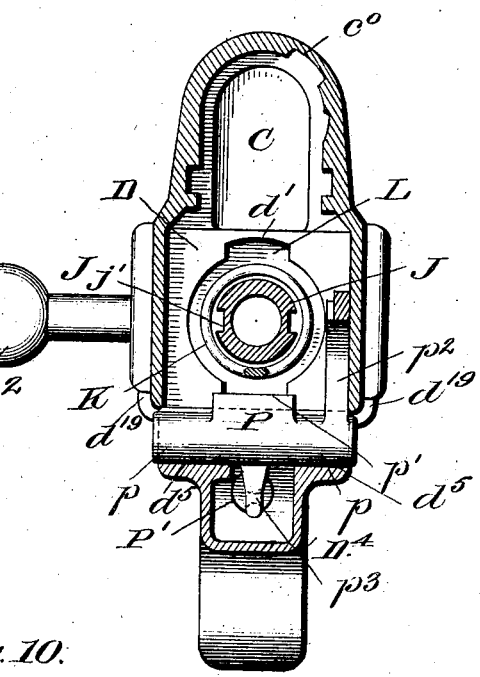
Figure 10:
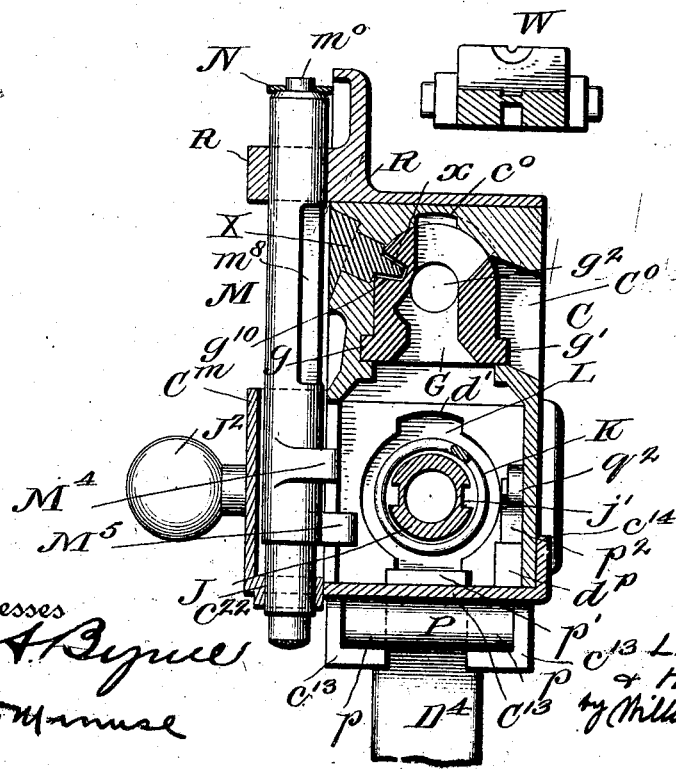
Figure 45:
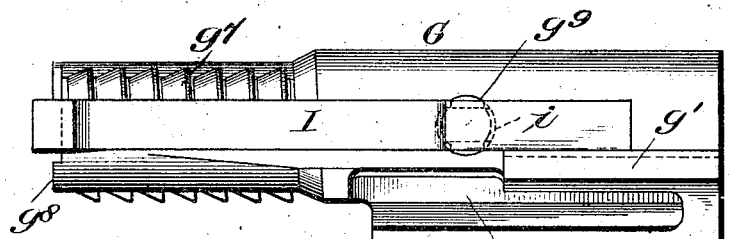
Figure 46:
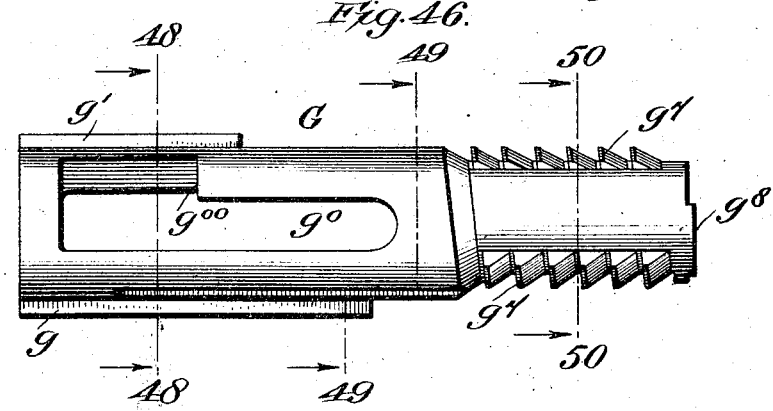
Figure 47:
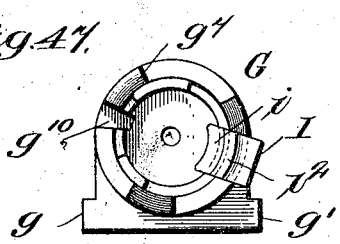
Figure 48:
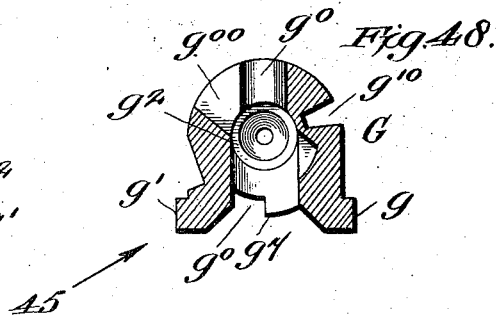
Figure 49:
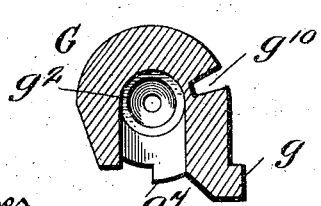
Figure 50:
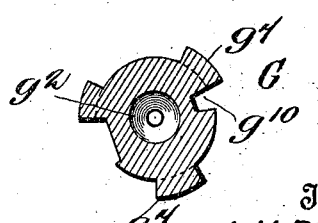

Figures 1 and 1ª show the gun in side elevation, the cartridge strip being omitted. Figs. 2 and 2ª show the gun in plan, with the cartridge strip broken away. Fig. 3 is a front elevation of the gun as seen from the muzzle. Fig. 4 is a rear elevation of the gun, as seen from the breech. Figs. 5 and 5ª show a central vertical section through the gun, the parts being drawn full size. In these figures the barrel and stock of the gun are broken away, and the cartridge strip is omitted. In these two figures the breech mechanism is shown in the closed and locked position. Figs. 6 and 6ª are similar to Figs. 5 and 5ª, except that the breech is open, and the gas operated piston is in the cocked position. In Fig. 6, the cartridge strip is indicated in dotted lines. Figs. 7 and 7ª show a horizontal section on the line 7—7 of Figs. 5 and 5ª, parts being shown in elevation. Fig. 8 shows a section along the line 8—8 of Fig. 5, and looking in the direction of the arrows. Fig. 9 shows a section along the line 9—9 of Fig. 5, and looking in the direction of the arrows. Fig. 10 shows a section along the line 10—10 of Fig. 5, and looking in the direction of the arrows. Fig. 11 shows a section along the line 11—11 of Fig. 5, and looking in the direction of the arrows. Fig. 12 shows a section along the line 12—12 of Fig. 5, and looking in the direction of the arrows. Fig. 13 shows a section along the line 13—13 of Fig. 5ª, and looking in the direction of the arrows, and Fig. 14 shows a section along the line 14—14 of Fig. 5ª, looking in the direction of the arrows. Fig. 15 is a side elevation of the barrel detached from the gun, parts being broken away. Fig. 16 shows a section along the line 16—16 of Fig. 15, and looking in the direction of the arrows. Fig. 17 shows a section along the line 17—17 of Fig. 15, and looking in the direction of the arrows, and Fig. 18 shows a section along the line 18—18 of Fig. 15, and looking in the direction of the arrows. Fig. 19 is a perspective view of the receiver detached from the gun, parts normally secured to and forming part of the receiver being omitted for the sake of clearness in the drawings. Fig. 20 is a detail perspective view of the lower feed piece support, detached from the receiver. Fig. 21 is an interior view on a larger scale of the device shown in Fig. 20. Fig. 22 is a side elevation of the receiver on a smaller scale, the parts omitted in Fig. 19 being shown as applied in this figure. Fig. 23 is a side elevation of the receiver, as seen from the opposite side from that indicated in Fig. 22. Fig. 24 shows a central longitudinal vertical section through the receiver, the operating parts inclosed therein being all omitted. Fig. 25 shows a plan view of the receiver, as shown in Figs. 22 to 24. Fig. 26 is an end view of the receiver, as seen from the rear. Fig. 27 is an end view of the receiver, as seen from the front. Fig. 28 shows a cross section of the receiver along the line 28—28 of Fig. 25, looking in the direction of the arrows. Fig. 29 shows a cross section through the receiver along the line 29—29 of Fig. 25, looking in the direction of the arrows. Fig. 30 shows a cross section through the receiver along the line 30—30 of Fig. 25, looking in the direction of the arrows. Fig. 31 shows a cross section along the line 31—31 of Fig. 25, looking in the direction of the arrows, and Fig. 32 shows a cross section along the line 32—32 of Fig. 25, looking in the direction of the arrows. Fig. 33 is a perspective view of the shoulder piece detached from the gun. Fig. 34 shows a horizontal section through the upper part of the shoulder piece and looking down, the horizontal section being taken through the line 34—34 of Fig. 33. Fig. 35 shows a cross section along the line 35—35 of Fig. 34, and looking in the direction of the arrows. Fig. 36 is a side elevation of the breech nut. Fig. 37 shows a section through the breech nut along the line 37—37 of Figs. 38 and 39. Fig. 38 shows a section along the line 38—38 of Figs. 36 and 37, and looking in the direction of the arrows. This figure also shows the breech block, firing pin and extractor in section, the breech block being in the closed and locked position. Fig. 39 is a similar view to that shown in Fig. 38, except that the firing pin is withdrawn and the breech block is in the unlocked position. Figs. 40 to 44 show various relative positions of the operating lug on the breech nut, and the cam faces on the gas operated piston. Fig. 45 shows an elevation of the breech block, looking at an inclination upward, as indicated by the arrow 45 in Fig. 48. Fig. 46 shows a top plan of the breech block. Fig. 47 is a front view of the breech block. Fig. 48 shows a section through the breech block along the line 48—48 of Fig. 46, and looking in the direction of the arrows. Fig. 49 shows a section through the breech block along the broken line 49—49 of Fig. 46, and looking in the direction of the arrows. Fig. 50 shows a section through the breech block along the line 50—50 of Fig. 46, and looking in the direction of the arrows. Fig. 51 shows a side elevation of the breech nut inclosing the breech block, the two being in the unlocked position. Fig. 52 shows a central vertical section through the parts shown in Fig. 51. Fig. 53 shows a section through the breech nut and breech block, firing pin and extractor, showing the breech closed and locked, this section being taken along the line 53—53 of Fig. 38, and looking in the direction of the arrows. Fig. 54 is a detail perspective view of the firing pin detached from the gun. Fig. 55 is a perspective view of the motor piston, with the feed piece shown in dotted lines. Fig. 56 shows a vertical central section through the motor piston with the cocking toe shown in dotted lines. Fig. 57 is an inverted plan view of the motor piston. Fig. 58 is a rear view of the motor piston, as seen from the left of Fig. 56. Fig. 59 is a front view of the motor piston, as seen from the right of Fig. 56. Fig. 60 shows a section through the motor piston along the line 60—60 of Fig. 56, and looking in the direction of the arrows. Fig. 61 shows a section through the motor piston along the line 61—61 of Fig. 6, and looking in the direction of the arrows. It also shows the outline of the breech nut in dotted lines. Fig. 62 shows a section through the motor piston along the line 62—62 of Fig. 56, and looking in the direction of the arrows, and Fig. 63 shows a similar section along the line 63—63 of Fig. 56, looking in the direction of the arrows. Fig. 64 shows a horizonal section along the line 64—64 of Fig. 55, with part of the feed mechanism indicated in dotted lines. Fig. 65 shows a horizontal section along the line 65—65 of Fig. 55, and illustrates the same part of the feed mechanism as is shown in Fig. 64, but the piston is supposed to have moved forward from the position shown in Fig. 64 to that shown in Fig. 65. In Fig. 65 the piston is in the forward position, and in Fig. 64 it is in the recoiled position. Fig. 66 is a perspective view of the cocking piece, parts being broken away. Fig. 67 is a perspective view of the supporting washer in the rear of the gun. Fig. 68 is a perspective view of the abutment nut for engaging the hook of the cocking piece. Fig. 69 is a detail showing the mounting for the supporting legs, parts being shown in section. Fig. 70 is a detail showing the foot of one of the supporting legs. Fig. 71 is a perspective view of the trigger piece. Fig. 72 is a perspective view of the sear. Fig. 73 is a perspective view of the rear loading guide, and Fig. 74 is a perspective view of the front loading guide, both of which guides are attached to the receiver. Figs. 75 and 76 are vertical sections through the shoulder piece, and show the trigger mechanism in two positions; in Fig. 75 the trigger, shown in full lines, is in the cocked position for automatic firing, and, as shown in dotted lines, is in the firing position; in Fig. 76, the trigger mechanism is in the position for single shot firing. Fig. 77 shows a section along the line 77—77 of Fig. 75, looking in the directon of the arrows, and it shows, in full lines, the cocking piece in the position for automatic firing, and in dotted lines it is shown in the position for assembling. Fig. 78 shows a section along the line 78—78 of Fig. 75, looking in the direction of the arrows, and Fig. 79 shows a section along the line 79—79 of the upper part of Fig. 75, looking in the direction of the arrows. Fig. 80 is a rear view of the cocking piece shown in the position for single shot firing. Fig. 81 shows the cocking piece in the safety position. Fig. 82 shows a section along the line 82—82 of Fig. 76, and looking in the direction of the arrows. Fig. 83 is a detail showing the feed strip and part of the feed mechanism, being a section along the line 83—83 of Fig. 84, and looking in the direction of the arrows. Fig. 84 is a plan view of the device shown in Fig. 83. Fig. 85 is a detail showing the feed piece in perspective. Fig. 86 shows a section on the broken line 86—86 of Fig. 84, and looking in the direction of the arrows, part of the breech mechanism being shown in dotted lines, and the feed piece being in the raised or operative position Fig. 87 is a similar view to that shown in Fig. 86, except that the parts of the breech mechanism are shown in full lines, and that the feed piece is in the lower position. Fig 88 shows a section along the line 88—88 of Fig. 86, and looking in the direction of the arrows. Fig. 89 shows a section along the line 89—89 of Fig. 87, and looking in the direction of the arrows, and Fig. 90 shows a section along the line 90—90 of Fig. 89, and looking in the direction of the arrows. Fig. 91 is a detail showing in perspective the feed spring. Fig. 92 is a perspective view of the perforated guard, in which the front end of the motor piston vibrates. Fig. 93 is an end view of the guard shown in Fig. 92, as seen from the rear, and Fig. 94 is a front view of said guard, parts being broken away, and Fig. 95 shows a section on an enlarged scale along the line 95—95 of Fig. 1$^a$, and illustrates the mode of securing the guard to the gun.

A represents the gun barrel, which is provided with the enlarged breech portion A' for the powder chamber $a$, and with a passage $a'$ for part of the powder gases, see Fig. 5$^a$, and it is also provided with a swell $a^2$, which not only serves to strengthen the muzzle of the gun, but also may be used with a blank firing apparatus of the type shown in the patent to L. V. Benét, No. 606,115, granted January 11, 1898, and entitled gas operated gun. The barrel is also provided with an enlargement $a^0$ for the front sight bracket, which will be hereinafter described. Near the rear end of the barrel it is provided with an abutment $a^3$, which is held against the shoulder $b'$ of the lock nut B, which is provided with screw threads $b$ to engage the screw threads $c$ on the receiver C. Thus this nut B locks the barrel and the receiver firmly together. The barrel is held against rotation in the receiver by having a lug $a^4$, which projects down into a slot $c^i$ in the receiver C, as shown in Figs. 5$^a$, 6$^a$ and 27. Portions of the breech of the barrel are cut away exteriorly, as shown at $a^5$ in Fig. 18 to facilitate cooling and to lighten the gun. The rear part of the nut B is split, as at $b^2$ to form a spring grip on the receiver C in assembling. The barrel is also provided with a shoulder $a^6$ for the breech nut, is cut away at $a^7$ to guide the projectile into the powder chamber, and is also cut out at $a^8$ for the extractor and at $a^9$ for the rim of the cartridge case, and for the nose of the breech block. It will be noted that the barrel A, the lock nut B, and the receiver C are rigidly secured together, and the receiver is also rigidly secured to the shoulder piece D, to which is firmly attached the stock D'.

The receiver C contains or supports most of the operative parts of the mechanism, first of which may be mentioned the breech nut E. This is shown in the various longitudinal sections through the breech, but in detail in Figs. 36 to 39, and 51 to 53. This breech nut is mounted in the receiver co-axial with the barrel, and while the barrel is fixed against rotation, the breech nut is arranged to rotate about its axis through a predetermined angle in opening and closing the breech. It is, however, held firmly against longitudinal motion, abutting against the shoulder $a^6$ of the barrel and against the lug $c^6$ of the receiver, which latter lug is preferably inclined, as shown in Figs. 5 and 6, to engage the inclined face $e^6$ of the breech nut E. This breech nut is made in the form of a sleeve $e$ in its forward part, and is slotted longitudinally in its rear part, as at $e'$ to receive the cartridge, and as at $e^2$ to permit the cartridge to fall out. It is further cut away, as at $e^3$, to engage a part of the feed strip O, as will be hereinafter described. The breech nut E is provided with a lug E' having two cam faces $e^4$ and $e^5$, which cause the breech nut to rotate for locking or unlocking the breech block, as will be hereinafter described. On the interior of the breech nut, it is provided with a buttress thread $e^7$ slotted so as to leave three full and three blank sectors, and one of the blank spaces is deepened somewhat, as at $e^8$, to permit the free entry of the extractor, and to the left of which, as shown in Figs. 37 to 39, and Fig. 53, there is a cam surface $e^9$, which causes the extractor to lock over the rim of the cartridge case, and grip the same firmly without the necessity for any extractor spring, as will be hereinafter described.

F represents the motor piston, which carries the cup-shaped piston head F', which receives part of the powder gases through the opening $a'$ in the barrel, and the passages $u$ and $u'$ in the bracket U, which bracket has a boss U' fitting snugly in the cup piston F' and clearing the same when the piston has recoiled sufficiently to the rear, the extreme positions of the cup piston being shown in Figs. $5^a$ and $6^a$. For convenience of manufacture, the bracket U also constitutes a support for the front sight V. The motor piston is driven backwards by the powder gases and is returned to the initial position by the main spring K, and the means for operating by hand will be hereinafter described. The general shape of the motor piston F is as shown in Figs. 55 to 57. On its upper side it carries a guide rib $f$, which engages the lug E' on the breech nut E, and rocks the nut to the engaging position in assembling the mechanism. In rear of this guide $f$, two cam faces $f^1$ and $f^3$ are provided, which engage the corresponding cam faces $e^4$ and $e^5$ of the lug E' of the breech nut, and thus rock this nut to the position for releasing or holding the breech block. There is a slight lost motion between this lug and the cam faces $f^1$ and $f^2$ for reasons hereinafter to be explained. The motor piston is provided with a lug $F^2$ on its heel, in front of which is a yoke $F^3$, as shown most clearly in Figs. 55 and 56. The breech block G has a slot $g^0$ in its heel, which slips over this lug $F^2$ and thus connects the breech block to the motor piston. The breech block is provided with guide ribs $g$ and $g'$, which engage in corresponding guide grooves in the receiver, and thus the breech block is free to reciprocate in said receiver, but is held against turning therein. The head of the breech block is provided with interrupted buttress screw threads $g^7$ to engage with the similar screw threads $e^7$ of the breech nut. The breech block G is recessed to receive the firing pin H, which latter moves with the motor piston, being provided with a lug $h$ which engages back of the yoke $F^3$. This firing pin has a second lug $h'$ having a cam face $h^2$, see Figs. 5, 6 and 54, which lug $h'$ is free to travel longitudinally in the slot $g^0$ of the breech block G, but is cammed in rear of the shoulder $g^{00}$ by engagement with the cam groove $c^0$ in the receiver, see Figs. 5, 6, 10, 19 and 24. Thus it will be seen that the first part of the recoil of the motor piston will drag the firing pin to the rear, but without moving the breech block to the rear; then the breech nut will be turned and unlocked about the time that the lug $F^2$ on the motor piston reaches the end of the slot $g^0$ in the breech block, when the breech block will also be withdrawn to the rear, and thereupon the cam $h^2$ on the lug $h'$ of the firing pin will engage the cam face $c^0$ of the receiver and the firing pin will be rocked until the lug $h'$ engages the shoulder $g^{00}$, by which engagement the breech block will be positively locked to the motor piston until it returns to this position on counter-recoil, when the reverse cycle of operations will take place.

In Fig. 52 the firing pin H is shown in the position just before it begins to rock to lock the breech block to the motor piston, and in Fig. 6 the firing pin is shown, after being rocked to the locking position. Thus it will be seen that the firing pin always moves with the motor piston, but that in the initial operation of opening the breech, and in the final operation of closing the breech, the firing pin has a limited longitudinal travel independently of the longitudinal movement of the breech block. After this limited longitudinal movement in opening, the firing pin locks the breech block to the motor piston, and the three parts so locked together continue rearward during recoil, and forward again on counter-recoil, until the cam face $h^2$ strikes the cam groove $c^0$ on counter-recoil. Then the firing pin will be rotated until the lug $h'$ is disengaged from the shoulder $g^{00}$; at this time the further forward movement of the breech block is arrested by the engagement of the rib $g^8$ on the nose of the breech block with the rear face $a^9$ of the gun barrel, and the engagement of the lug E' of the breech nut with the cam face $f^4$ rocks the breech nut to the locked position. While this camming is being effected, the point $h^3$ of the firing pin continues to move forward in the recess $g^2$ of the breech block until it strikes the cartridge and the gun is fired, whereupon the cycle of operations is repeated. The above description applies to one complete automatic cycle of operations without complicating the same with the feed or extractor mechanism, or with the hand operated means of controlling the fire.

The extractor I is provided with a segmental dovetail lug $i$, which fits in the corresponding socket $g^3$ in the side of the breech block, and this lug is inserted in said socket in a transverse position, and then the extractor is swung to the longitudinal position, after the manner of a bayonet joint, thus locking the parts firmly together in the position shown in Fig. 53. The claw of the extractor is provided with the usual wedging face $i'$, and on its back is provided with a second cam face $i^2$, which is adapted to engage the cam $e^9$ on the interior of the breech nut, when said nut is rotated to the locked position, and thus this cam $e^9$ presses the extractor claw firmly down in engagement with the rim of the cartridge case, as shown in Figs. 38, 39 and 53. Thus it will be seen that the claw of the extractor is free to ride freely over the rim of the cartridge case and to snap in front of the same, as the breech block reaches the forward position, and then is cammed down hard over the rim of the cartridge case, and cannot be shaken loose until the breech block is moved slightly rearward in the breech nut. This will cause the extractor to hold very firmly during the operation of starting the empty cartridge case from its seat after the gun has been fired, but will permit the empty cartridge case to be freely dislodged from such engagement by the ejector mechanism, after the cartridge case has been withdrawn rearward a sufficient distance.

The ejector mechanism comprises a block X secured in the receiver C, as shown in Figs. 10 to 12, and in Figs. 26 to 29, which block has a finger $x$, which projects into a groove $g^{10}$ in the side of the breech block, and this finger strikes the edge of the cartridge case opposite to that held by the extractor, when the breech block is withdrawn and flips the cartridge case out of engagement with the claw of the extractor, causing said cartridge case to be thrown through the opening $C^9$ at one side of the receiver.

J represents the cocking piece, shown in detail in Fig. 66. This cocking piece is in the form of a rigid bar or rod, and is provided with a forwardly projecting arm $J'$, which is provided with a hook $j$ adapted to pass through the opening $y$ in the abutment nut Y, which is screwed into the hollow motor piston F, see Figs. $5^a$, $7^a$, and 68. This abutment nut is locked in place by a pin $y'$. This abutment nut forms a forward bearing for the main spring K, and in the automatic operation of the gun the hook $j$ extends forward of the abutment nut and does not affect the reciprocating of the motor piston, as shown in Figs. 6 and $6^a$. But when this cocking piece is drawn back by hand, it pulls back the motor piston and compresses the said spring, thus enabling the motor piston to be drawn to the rear by hand, when desired, thus opening the breech and cocking the piece. By having this cocking piece rigid as shown, it may be conveniently inserted from the rear, passed through and turned to engage the abutment nut; while it may also be as conveniently withdrawn in disassembling the parts. The firing mechanism will be described later.

The diaphragm of the abutment nut is cup-shaped, as at $y^2$, to guide the hook $j$ into the opening $y$, in inserting the cocking piece. This opening $y$ is made oblong, as shown in Figs. 11 to 13, so that in assembling the hook $j$ may be inserted in the vertical position, and then may be turned through an angle to the locked position, as indicated in Figs. 11 to 13.

The cocking piece J is provided with two guide grooves $J'$ to engage guide lugs $l$ of the supporting washer L, which is slipped over the hook end of the cocking piece, and which finally is held over the cylindrical portion $j^2$ of the cocking piece by means of the tenons $l'$, which engage in grooves $d'$ in the shoulder piece D, see Figs. 6, 8, 9, 10 and 67. Thus it will be seen that this washer forms an end bearing for the main spring K, and is held against turning in the shoulder piece D. The rear face of the supporting washer is provided with three sets of radial grooves $l^3$, to engage the ribs $j^3$ on the cross piece $j^4$ integral with the cocking piece J. By turning the cocking piece slightly, the ribs $j^3$ will wedge forward the supporting washer L against the action of the spring K, and the said ribs may be caused to engage any one of the three sets of radial grooves $l^3$, thus holding the cocking piece in any one of three operative positions, which will be hereinafter described.

In order that the cocking piece may be turned through a limited angle only, the rear face of the supporting washer is inclined away from the perpendicular shoulders $l^4$, and the ribs $j^3$ press back the supporting washer when turned, but bring up against these perpendicular shoulders, and arrest the rotation of the cocking piece when the limiting angle is reached. This cross piece $j^4$ is inserted from the rear in the elongated slot $d^4$ of the shoulder piece D, and is then turned through an angle into the chamber $d^5$ in said shoulder piece, thus locking the said cocking piece to the gun, except when it is desired to withdraw same by hand, in which case it is turned back until the cross piece $j^4$ may be withdrawn rearward through said slot $d^4$, which position for assembling and withdrawing the said cocking piece is indicated in dotted lines in Fig. 77.

For convenience of turning the cocking piece, a hand knob $J^2$ is provided. The cocking piece is provided with a cup-shaped cap $J^3$, which is beveled off, as at $J^5$, to fit over the beveled faces $c^6$ at the rear end of the receiver, and thus provide a suitable bearing for said cocking piece. The cap $J^3$ of the cocking piece is provided with a segmental abutment $J^4$, which projects beyond the normal circumference of said cap, and is provided with an engaging face $j^6$ to engage the trigger piece, as will be hereinafter described, and also with an end piece $j^7$, which engages a stop $c^7$ on the receiver, when the cocking piece is turned to the position for assembling. The periphery of the cap is also provided with two slots $J^5$ and $J^6$ spaced at an angle from each other, as shown in Figs. 80 and 81. The slot $J^5$ is of the same radial depth as $J^6$, but it is narrower, for purposes that will be hereinafter described. Between these slots $J^5$ and $J^6$ part of the edge of the cap $J^3$ is cut away in a straight line, as at $j^9$. The slot $J^5$ is provided for convenience in assembling the parts, as shown in dotted lines in Fig. 77. The slot $J^6$ is provided for use in automatic firing, as will be hereinafter described, and the straight edge $j^9$ is used in single shot fire, as will be hereinafter described.

P represents the sear, which is pivoted in the shoulder piece, as at $p$, and is provided with a cocking toe $p'$, which is adapted to snap into engagement with the cocking shoulder $f^6$, under the action of the spring $P'$. This sear is provided with a cocking arm $p^2$, which engages the hook $q^2$ of the trigger piece Q, which is provided with a pin $q$ connecting the same by means of the spring $P'$ to the arm $p^3$ of the sear piece, and thus the same spring P' tends to rock the sear about its pivot and also to draw the trigger piece forward. The movement of the sear in the forward position is arrested by a lug $d^9$ on the shoulder piece; while the trigger piece is stopped in its forward position by the shoulders $d^{11}$ at the end of the slot $d^{10}$ in said shoulder piece. In this slot the horizontal piece Q' of the trigger piece slides freely, and at the same time has a slight rocking motion about the point $q'$, as shown in Figs. 71 and 76. This trigger piece carries the trigger $Q^2$ projecting downwardly therefrom, and also the tail piece $Q^3$ having the wedge face $q^3$, and the shoulders $q^4$ and $q^5$.

It will be noted when the cocking piece is turned to the safety position, shown in Fig. 81, that the shoulder $j^6$ (see Fig. 66) will engage the shoulder $q^5$ at the end of the trigger piece, and will prevent the trigger piece from being drawn back, and thus will prevent the gun from being fired. Now, if the cocking piece be turned slightly to the left, from the position shown in Fig. 81, to that shown in Fig. 77, this will allow the notch $J^6$ to register with the tail piece $Q^3$ of the trigger piece Q, the rib $q^3$ passing into the groove $j^8$ and the trigger may be drawn to the rear, and so long as it is held in this position the hook $q^2$ will be held in engagement with the cocking arm $p^2$, and the firing will continue indefinitely as long as the trigger is held back and the gun is supplied with ammunition. Now, if the cocking piece be turned still further to the left, to the position shown in Figs. 76 and 80, the cut away portion $j^9$ will be clear of the shoulder $q^5$, but will tend to engage the wedge face $q^3$, and now if the trigger is drawn back, to the position shown in Fig. 76, the first effect will be to draw the cocking arm $p^2$ backwards, throwing the cocking toe $p'$ out of engagement with the shoulder $f^6$ of the motor piston, and allowing the motor piston to fly forward under the tension of the spring K. As soon as the cocking toe $p'$ has released the motor piston, the further rearward movement of the trigger piece will rock the trigger piece about the pivot $q'$ releasing the hook $q^2$ from engagement with the arm $p^2$, and allowing the sear to fly forward, the parts then being in the position shown in Fig. 76. On recoil, the inclined face $f^7$ of the motor piston will rock the cocking toe $p'$ backwards until it passes the shoulder $f^6$, when the spring P' will snap it into engagement with said shoulder, and will hold the motor piston against going forward again until the trigger is again pulled.

To prevent accidents from premature firing when the cocking piece is in the position for assembling, indicated in dotted lines in Fig. 77, the slot $J^5$ is made wide enough to allow the swinging up therein of the tail piece $Q^3$, which will cause the upper portion of the shoulder $q^4$, above the wedge face $q^3$, to rock up and engage an abutment $d^{12}$ on the shoulder piece, and thus will lock the trigger piece against being drawn further rearward. Also, if through mistake, the cocking piece has not been fully returned to the forward position, it will be impossible to fire the gun, as the shoulder $q^4$ of the trigger piece will bear against the shoulder $d^{12}$ of the shoulder piece. Thus it will be seen that the cocking piece has four distinct positions, first, the assembly position; second, the safety position, in neither of which two positions can the gun be fired; third, the position for automatic firing; and fourth, the position for single shot firing. The first, or assembly position, is shown in dotted lines in Fig. 77, the second, or safety position, is shown in Fig. 81; the third, or automatic firing position, is shown in full lines in Fig. 77; and fourth, or single shot firing position, is shown in Fig. 80.

In assembling the gun, the barrel is connected to the receiver, as already described, and the front end of the shoulder piece D is connected to the receiver by a tee $D^0$, whose tenons $d^{13}$ engage in hooks $c^{13}$ secured to the plate $C^{13}$ fast to the receiver C, as shown in Figs. 23 and 24. This plate preferably has up-turned flanges $c^{14}$ and $c^{15}$ secured to the sides of the receiver. The shoulder piece has an upwardly projecting housing $D^2$, terminating in an end piece $D^3$ provided with shoulders $d^{16}$ and $d^{17}$, and the said housing is provided with tenons $d^{18}$. The sides of the shoulder piece are provided with ribs $d^{19}$, beneath which is located the trigger housing $D^4$, in front of which is the bearing $D^5$ for the sear. In rear of the trigger housing is the fork $D^6$ to receive the gun stock D'. The shoulder piece is also provided with a guide slot $d^{20}$ for the trigger piece. In connecting the shoulder piece D to the receiver C, the tee $D^0$ is placed with its tenons $d^{13}$ just in front of the hooks $c^{13}$, and then the housing $D^2$ is swung up into the receiver until the end piece $D^3$ closes the rear end of the receiver; and the shoulder piece is then drawn back to the final locked position, at which time the shoulders $d^{16}$ and $d^{17}$ engage corresponding shoulders $c^{16}$ and $c^{17}$, at the rear of the receiver. The tenons $d^{18}$ rest over shelves $c^{18}$, and the tenons $d^{13}$ fit snugly in the hooks $c^{13}$. Thus the shoulder piece is firmly locked to the receiver, and closes the rear end of said receiver. It will be evident that the trigger piece, sear piece, and sear spring should all be mounted in the shoulder piece before the latter is inserted in the receiver, and that the several parts may be assembled without the use of any special tools.

Secured to the lower right hand side of the receiver is the feed piece support $C^m$, shown detached in Fig. 20, and on an enlarged scale from the opposite side in Fig. 21. This feed piece support $C^m$ is secured opposite an opening in the side of the receiver, as shown in Figs. 19, and 29 to 30.

We have so far described the general operation of the gun exclusive of the apparatus for loading, which will now be described.

M represents the feed piece, which is mounted in the lower feed piece support $C^m$, as shown most clearly in Figs. 86 to 90, and is pivoted in the rear loading guide R, as shown in Figs. 1, 2, and 87. This feed piece is shown in perspective in Fig. 85 and comprises a vertical shaft M' carrying a feeding arm $M^2$ having a feed lug $M^3$, which is beveled upwards, as at $m$, rounded as at $m'$, and has an engaging face $m^2$. The vertical shaft M' also carries two lugs $M^4$ and $M^5$, both of which have rounded ends, and the latter of which is provided with two beveled faces $m^5$ and $m^6$, as shown most clearly in Fig 90. The feed piece has a lower bearing $m^7$, which projects down through the socket $c^{23}$, in the supporting piece $C^m$, and the arm $M^5$, when there is no feed strip in the gun, will normally drop down to the position shown in Figs. 87, 89 and 90, and in dotted lines in Fig. 55, owing to the pressure of the spring N. When in this position, the arm $M^5$ will drop in the way of the cam face $f^8$ of the motor piston, and will arrest the forward movement of the motor piston in returning to the initial position, said arm then being held between the bevel faces $c^{21}$ and $f^8$, thus holding the motor piston against further forward travel. Now, however, if the feed piece be lifted, as by inserting a fresh feed strip, or by hand, then this arm $M^5$ will be released from engagement with the face $f^8$ of the motor piston, and the latter will return forward to the initial position, that is to the breech closed position. The feed piece is normally pressed downwards causing the arm $M^5$ to engage, as already described, by means of a feed spring N, shown in Figs. 1, 2, 86, 87, and in detail in Fig. 91. This spring is perforated, as at $n^0$, to slip over the lug $m^9$, and its other end N' is held in guides $r'$ in the forward loading guide R', see Figs. 1, 2 and 74. This spring thus tends to press down the feed piece, but it also has another function, that is it acts as a pawl to prevent the backward motion of the feed strip O. This result is obtained by providing a downwardly projecting claw $N^2$ having an inclined face $n'$, and a holding edge $n^2$, which latter is projected down into the openings $o$ of the feed strip O, as shown in Fig. 86, and while the inclined face $n'$ permits the feed strip to be fed to the right in Fig. 86, the holding face $n^2$ will prevent the feed strip from being withdrawn backwards. The feed strip is fed forwards by the reciprocating motion of the feed arm $M^2$. As the feed lug $M^3$ swings forwards from the position shown in Fig. 86, it will engage in one of the central holes $o'$ of the feed strip, and will press against the forward edge $o^2$ of said hole, pushing the feed strip forwards. When the feed arm oscillates in the reverse direction, the bevel face $m$ is cammed up against the downward pressure of the spring N and lifts the feed piece, permitting the same to swing freely backwards. At the same time the lip $N^2$ of the feed spring N prevents any back lash of the feed strip O. The feed strip O is of precisely the same construction, as fully described and claimed in our Patent No. 646,792, dated April 3, 1900, but in use the feed strip is turned upside down, instead of being used in the position shown in the patent aforesaid. This oscillation of the feed piece M is effected by the engagement of the lugs $M^4$ and $M^5$ with corresponding cams on the motor piston, as will now be described.

Suppose the gun to be unloaded and the breech closed: draw the motor piston backward by hand, using the cocking piece, until it is slightly in rear of the cocked position, shown in Fig. 6. The distance between the shoulders $f^6$ and $f^8$ on the motor piston is so adjusted that the shoulder $f^6$ will engage the arm $M^5$ when in the lowered position, slightly before the cocking toe $p'$ engages the shoulder $f^8$. Thus this arm $M^5$ of the feed piece will of itself alone hold the motor piston in the rear position. Now, if the feed is lifted either by hand, or by the insertion of a feed strip, the arm $M^5$ will be lifted out of engagement with the shoulder $f^8$, and the motor piston will travel slightly forward to the cocked position, shown in Figs. 6 and 56, and will then be ready to fly forward when the trigger is pulled. So long as the feed piece is held in the raised position, that is, so long as there is a feed strip in the gun, the arm $M^5$ will be lifted clear of the locking position, and the motor piston can only be held in its rear position by the cocking toe, and this may be thrown out of engagement, as already described.

Suppose the motor piston to have passed from the position held back by the arm $M^5$, to the cocked position shown in Fig. 6, if the trigger be pulled, the motor piston will fly forwards causing the cam $f^9$ to rock the arm $M^5$ to the position shown in Figs. 86 and 88, which will rock the feed piece and with it the arm $M^2$ back to the position shown in full lines in Figs. 83 and 84, in which position the feed lug $M^3$ will project down into one of the holes $o^2$ in the feed strip and will be ready to feed the feed strip forward when said feed piece is rocked in the reverse direction, or to the central position indicated in dotted lines in Fig. 84. This rocking forward of the feed strip is effected by the engagement of the lug $M^4$ with the cam face $f^{10}$ on the motor piston, which cam face strikes said lug $M^4$ as the piston travels rearward, after the gun has been fired. The engagement of these lugs $M^4$ and $M^5$ with the cams $f^{10}$ and $f^9$ is shown diagrammatically in Figs. 64 and 65. Thus it will be seen that the feed piece serves as a positive lock to the operation of the gun until said feed piece is either lifted by hand or by the insertion of a feed strip, and that the feed spring tends to press said feed piece into the locking position, and it also serves as a stop to prevent back lash of the feed strip. To remove a partially used feed strip, it is only necessary to lift the feed piece slightly by hand. This will not only lift the feed lug $M^3$ out of engagement with the feed strip, but will also lift the claw $N^2$ of the feed spring out of engagement with said feed strip, and the feed strip may then be backed out of the gun. For convenience in assembly, the feed piece is cut away, as at $m^8$, to pass between the jaws $r^6$ of the loading guide R, being then in the position indicated in dotted lines towards the top of Fig. 84, and then if the feed piece be rotated to the right, as shown in said figure, it will be held in place by said jaws.

The cartridges are withdrawn *seriatim* from the feed strip, by means of the tongue $C^9$, which projects between the bottom of the feed strip and the top of the cartridge, the ends of the feed strip traveling between the guides $r^5$ in the receiver, and the cartridges fall into the throat of the receiver to the position shown in dotted lines in Figs. 6 and 31, when the head of the cartridge case is struck by the nose of the breech block, and the nose of the cartridge is deflected by striking the surfaces $c^{12}$ and $a^7$ of the breech nut and barrel respectively, see Fig. 6, and is directed into the powder chamber, being pressed forward therein in the usual way.

Around the barrel, including the powder chamber, and the parts immediately forward thereof, and also including the forward end of the motor piston, a guard S is mounted, which consists of a shell made of thin metal provided with perforations $s$, which shell is preferably composed of two halves secured together and to the gun, as shown in detail in Figs. $1^a$, $2^a$, 92 to 94.

Each of the two side members of the guard is provided with a rib $s'$ adapted to engage in a corresponding socket $c^{21}$ attached to the receiver C, as shown in Fig. 95. The receiver is cut away, as at $c^{22}$, to permit the assembling of the guard. These ribs $s'$ being inserted in their respective sockets, and the two forward ends of the guard being divergent, these two ends are brought closely along the side of the barrel of the gun, and are locked to the gun by means of the stay bolt S', which has a screw threaded end $s^2$ to engage a nut $S^2$ carrying spring clips $S^3$ projecting into the crotch $s^3$ integral with said nut, as shown in Fig. 94. The opposite end of the stay bolt $S'$ may be provided with a similar locking arrangement, or it may be provided with a head $S^4$, shouldered as at $s^4$, to bear against the side of the guard, and with a crotch $s^3$, and spring clips $S^3$, similar to those already described. For convenience of assembly, it is preferable to have one head solid with the bolt, and the other screwed on, but both may be screwed on, if desired. These crotches $s^3$, together with the spring clips $S^3$ serve to hold the supporting legs T, when not in use, as shown in Figs. 19 and 29. The forward end of these supporting legs is connected by a universal joint to the grooved band $T'$ secured to the gun barrel, as shown in Figs. $1^a$, $2^a$, and 69; and these legs are preferably provided with feet $T^2$ comprising a holding point $t'$, a guard flange $t^2$, and a ball and socket joint $t^3$ held below the stop $t$ in the leg T, which leg is preferably made hollow for the sake of lightness, as shown in Figs. 69 and 70.

The operation of the entire apparatus is as follows:— Suppose the breech block and the motor piston to be in the forward position with the breech closed, as shown in Figs. 5 and $5^a$, the cocking piece to be in the safety position, shown in Fig. 81, and the receiver to be empty of ammunition, as shown in Fig. 5. In order to put the gun into operation, turn the cocking piece to the position shown in dotted lines in Fig. 77, when the hook $j$ will engage the abutment nut Y and the cocking piece is in the position to be drawn to the rear. Now draw the cocking piece to the rear until the shoulder $f^6$ is slightly in rear of the cocking toe $p'$, and the lug $M^5$ of the feed piece is in the position to drop into the recess before the shoulder $f^8$ of the motor piston. This will lock the motor piston slightly in rear of the cocked position, and the cocking piece should be restored to the forward position. Now, if the feed strip be inserted, or if the feed piece be lifted by hand, as for the insertion, by hand, of a single cartridge, the lug $M^5$ will be raised out of engagement with the shoulder $f^8$ of the motor piston, and the motor piston will be pressed forward by the main spring K until the cocking toe $p'$ arrests its further forward movement. The gun will now remain cocked until the trigger is pulled, but the trigger cannot be pulled to the rear until the cocking piece is rotated to one of the operative positions, that is to one of the positions shown in full lines in Fig. 77, or in Fig. 80, according as it may be desired to fire either automatically or single shot fire, as shown respectively in Figs. 75 and 76.

The cocking piece having been turned to one of the operative positions, if the trigger be pulled, the motor piston will fly forward and will carry the loose cartridge in the receiver forward into the powder chamber. Near the end of the forward stroke of the motor piston, the breech block will be arrested by striking the rear face of the barrel, and the further forward movement of the motor piston will cause the cam lug $E'$ to rotate the breech nut to the locked position. The breech block is uncoupled from the firing pin by the engagement of the cam $e^6$ with the lug $h'$, and the firing pin and motor piston are then free to move forward while the breech block is arrested. Just after the locked position of the breech nut is reached, the further forward movement of the motor piston will cause the firing pin to strike the primer, exploding the cartridge. In going forward the arm $M^5$ will have struck the cam $f^9$ of the motor piston and will have thrown the feed lug $M^3$ into the engaging position for feeding the feed strip forward during the return stroke of the motor piston. When the gun is fired, part of the powder gases will escape through the passage $a'$ in the barrel A, and will force the motor piston rearward against the action of the spring K. The motor piston in its rearward movement will first move freely backwards a very short distance, only far enough to withdraw the point of the firing pin clear of the face of the breech block. During this movement the motor piston will have moved far enough to cause the cam face $f^4$, shown in the initial position in Fig. 40, to have struck the cam face $e^4$, the parts then being in the position shown in Fig. 41. There is a slight lost motion provided between these cam faces $f^4$ and $f^5$, and the cam faces $e^4$ and $e^5$ for this purpose. Now, as the piston goes further rearward, it will rock the breech nut to the position shown in Figs. 42 and 43, when the breech nut will be unlocked from the breech block, and the motor piston, being entirely disengaged from the cam lug $E'$, moves rearward while the cam lug remains in the position shown in Fig. 44. As the piston goes rearward, it will rock the firing pin and cause it to couple the breech block to the motor piston, as already described. As the breech nut is rotated to the locked position, it has cammed the claw of the extractor firmly down over the rim of the cartridge case, and in rotating to unlock, the breech block is moved slightly rearward, owing to the pitch of the threads $g^7$, and during this movement the cartridge case is started from its seat, while, at the same time, the claw of the extractor is held in firm engagement therewith. When the breech nut is wholly unlocked from the breech block, the claw of the extractor is also released from this cam action, but the cartridge case is then loose, and is readily drawn rearward, until the opposite edge of the rim of the cartridge case strikes the ejector X, and the empty shell is ejected through the opening $C^0$ in the side of the receiver. As the motor piston moves rearward, the cam $f^{10}$ rocks the lug $M^4$ on the feed piece, and moves the feed lug $M^3$, causing it to move the feed strip far enough for the tongue $C^0$ to tear loose another cartridge.

The motor piston keeps on rearward until it reaches the rear limit of its travel; when it immediately starts to return, if the firing mechanism is in the position for automatic firing; or it is arrested by the cocking toe, if the firing mechanism is in the position for single shot firing, as has already been described. When the piston continues on forward, after passing the cocked position, the cam $f^9$ will strike the lug $M^5$ on the feed piece, and will rock said feed piece, causing the feed lug $M^3$ to engage the feed strip, ready for another step forward, when the piston recoils again. The cycle of operations may be repeated indefinitely. It will be noted that as soon as the feed strip is exhausted and falls to the ground, the feed piece will be pushed downward by the feed spring; and after the last cartridge has been fired, the motor piston will be held back by the engagement of the shoulder $f^8$ and the arm $M^5$. This will lock the gun against being fired, but with the motor piston in the rearward position. Upon the insertion of a fresh feed strip, the automatic firing will be resumed.

To dismount or assemble the parts: After having made certain that the breech is closed, remove the cocking piece J by turning it from right to left until it strikes its abutment on the receiver. Grasp the handle J² and draw it upwards and to the rear, in order to free the hook j from its engagement with the abutment nut Y, which is screwed in the piston; the cocking piece may now be entirely withdrawn. Push the shoulder piece D forward in order to overcome the pressure of the main spring K, and at the same time cause it to pivot downwards about the trunnions d¹³. The tenons d¹⁸ may now be disengaged from the receiver and the shoulder piece may be entirely removed. Now, withdraw the main spring K, the piston F, the breech block G, and the firing pin H. In order to dismount the feed mechanism, first of all, free the feed spring N by disengaging the hole n⁹ from the upper end of the shaft of the feed piece and remove it. Raise the feed piece M until the flattened portion m⁸ may be passed through the slot r⁶ in its journals and remove the feed piece. To dismount the barrel, first remove the casing S by unscrewing the assembling bolts S². Unscrew the locking nut B, when the barrel A may be removed. Once the barrel is removed the breech nut E may be withdrawn from the receiver. From the shoulder piece remove the trigger, the sear, the sear spring, and the supporting washer of the main spring. To remove the extractor from the breech block disengage its claw from the guide and turn the extractor about its pivot g⁹ until the latter is free from its seat. In order to assemble the gun proceed in inverse order.

It will be noted that the various parts may be dismounted and assembled without the necessity for any special tools whatever, and that the frame of the gun, including the receiver, shoulder piece, stock, barrel, and guard S, are all rigidly and securely connected together.

It will be obvious that various modifications might be made which could be used without departing from the spirit of our invention, and we do not mean to limit ourselves to precise details of construction, or to precise arrangements or combinations of parts.

Having thus described our invention, what we claim and desire to secure for Letters Patent of the United States, is :—

1. In a gun, the combination with a gun barrel and a reciprocating breech block provided with interrupted screw threads, of a breech nut revolubly mounted in rear of said barrel but held against longitudinal motion, said breech nut being provided with interrupted screw threads registering with those of the breech block, and means for rotating said breech nut to cause its threads to engage and disengage with those of the breech block, substantially as described.

2. In a gun, the combination with a gun barrel and a reciprocating breech block provided with interrupted screw threads, of a breech nut revolubly mounted in rear of said barrel but held against longitudinal motion, said breech nut being provided with interrupted screw threads registering with those of the breech block, and automatic means for rotating said breech nut to cause its threads to engage and disengage with those of the breech block, substantially as described.

3. In a gun, the combination with a gun barrel and a reciprocating breech block provided with interrupted screw threads, of a breech nut revolubly mounted in rear of said barrel but held against longitudinal motion, said breech nut being provided with interrupted screw threads registering with those of the breech block, and automatic means for rotating said breech nut to cause its threads to engage and disengage with those of the breech block, comprising a motor piston and a cam engagement between said motor piston and said breech nut, substantially as described.

4. In an automatic gun, the combination with a gun barrel and a longitudinally movable breech block provided with interrupted screw threads, of a breech nut revolubly mounted in rear of said barrel but held against longitudinal motion, said nut being provided with interrupted screw threads registering with those of the breech block, and a reciprocating motor piston connected to said breech block and engaging said breech nut for rotating same, substantially as described.

5. In an automatic gun, the combination with a gun barrel and a longitudinally movable breech block provided with interrupted screw threads, of a breech nut revolubly mounted in rear of said barrel but held against longitudinal motion, said breech nut being provided with interrupted screw threads registering with those of the breech block, and a reciprocating motor piston connected to said breech block and engaging said breech nut for rotating same, with an extractor carried by said reciprocating breech block, substantially as described.

6. In an automatic gun, the combination with a gun barrel and a longitudinally movable breech block provided with interrupted screw threads, of a breech nut revolubly mounted in rear of said barrel but held against longitudinal motion, said breech nut being provided with interrupted screw threads registering with those of the breech block, a reciprocating motor piston connected to said breech block and engaging said breech nut for rotating same, with an extractor carried by said reciprocating breech block, and an ejector projecting into a groove in said breech block and engaging the head of the cartridge case when the breech block is drawn rearward, substantially as described.

7. In an automatic gun, the combination with a gun barrel rigidly held in the frame of the gun, and a reciprocating hollow breech block provided with interrupted screw threads, of a breech nut revolubly mounted in rear of said barrel, but held against longitudinal motion, said breech nut being provided with interrupted screw threads registering with those of the breech block, a firing pin revolubly mounted in said breech block and having a limited longitudinal movement therein and being provided with a laterally projecting lug, a motor piston having a lug projecting upward into said breech block, and having a longitudinal play therein, and engaging said firing pin, a cam engagement, between said motor piston and said breech nut for rotating the latter to the locking position relative to said breech block, and a fixed cam engaging said lug on the firing pin and rotating the latter to the position for locking the breech block to the motor piston, substantially as described.

8. In an automatic gun, the combination with a gun barrel rigidly held in the frame of the gun, and a reciprocating hollow breech block provided with interrupted screw threads, of a breech nut revolubly mounted in rear of said barrel, but held against longitudinal motion, said breech nut being provided with interrupted screw threads registering with those of the breech block, a firing pin revolubly mounted in said breech block and having a limited longitudinal movement therein and being provided with a laterally projecting lug, a motor piston having a lug projecting upward into said breech block, and having a longitudinal play therein, and engaging said firing pin, a cam engagement between said motor piston and said breech nut for rotating the latter to the locking position relative to said breech block, a fixed cam engaging said lug on the firing pin and rotating the latter to the position for locking the breech block to the motor piston, with an extractor carried by the breech block, and means operated by the rotation of the breech nut for holding the claw of said extractor firmly in engagement with the rim of the cartridge case during the early part of the breech opening motion, substantially as described.

9. In an automatic gun, the combination with a gun barrel rigidly held in the frame of the gun, and a reciprocating hollow breech block provided with interrupted screw threads, of a breech nut revolubly mounted in rear of said barrel, but held against longitudinal motion, said breech nut being provided with interrupted screw threads registering with those of the breech block, a firing pin revolubly mounted in said breech block and having a limited longitudinal movement therein and being provided with a laterally projecting lug, a motor piston having a lug projecting upward into said breech block, and having a longitudinal play therein, and engaging said firing pin, a cam engagement between said motor piston and said breech nut for rotating the latter to the locking position relative to said breech block, a fixed cam engaging said lug on the firing pin and rotating the latter to the position for locking the breech block to the motor piston, with an extractor carried by the breech block, and means operated by the rotation of the breech nut for holding the claw of said extractor firmly in engagement with the rim of the cartridge case during the early part of the breech opening motion, and an ejector comprising a fixed tongue projecting into a groove in the side of the breech block, and engaging with the rim of the cartridge case as the breech block is drawn rearward, substantially as described.

10. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating breech block provided with interrupted screw threads registering with those of the breech nut and connected to said motor piston, with means for allowing the motor piston a limited play relative to said breech block, substantially as described.

11. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating hollow breech block provided with interrupted screw threads registering with those of the breech nut and connected to said motor piston, a firing pin revolubly connected to the motor piston, but reciprocating therewith and projecting forward through said hollow breech block, with means for locking said firing pin to the breech block and for unlocking same during a predetermined part of the movement of the motor piston, substantially as described.

12. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating breech block provided with interrupted screw threads registering with those of the breech nut and connected to said motor piston, with means for allowing the motor piston a limited play relative to said breech block, a resilient extractor carried by said breech block, and a cam engagement between said extractor and said breech nut for binding the claw of the extractor firmly over the rim of the cartridge case, during the period of starting the cartridge case from its seat, substantially as described.

13. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating hollow breech block provided with interrupted screw threads registering with those of the breech nut and connected to said motor piston, a firing pin revolubly connected to the motor piston, but reciprocating therewith and projecting forward through said hollow breech block, with means for locking said firing pin to the breech block and for unlocking same during a predetermined part of the movement of the motor piston, a resilient extractor carried by said breech block, and a cam engagement between said extractor and said breech nut for binding the claw of the extractor firmly over the rim of the cartridge case during the period of starting the cartridge case from its seat, substantially as described.

14. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating breech block provided with interrupted screw threads registering with those of the breech nut and connected to said motor piston, with means for allowing the motor piston a limited play relative to said breech block, a resilient extractor carried by said breech block, and a cam engagement between said extractor and said breech nut for binding the claw of the extractor firmly over the rim of the cartridge case during the period of starting the cartridge case from its seat, with an ejector secured in said receiver and projecting into a groove in the breech block on its opposite side from the extractor, and adapted to strike the rim of the cartridge case as the breech block is drawn rearward, substantially as described.

15. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating hollow breech block provided with interrupted screw threads registering with those of the breech nut and connected to said motor piston, a firing pin revolubly connected to the motor piston, but reciprocating therewith and projecting forward through said hollow breech block, with means for locking said firing pin to the breech block and for unlocking same during a predetermined part of the movement of the motor piston, a resilient extractor carried by said breech block, and a cam engagement between said extractor and said breech nut for binding the claw of the extractor firmly over the rim of the cartridge case during the period of starting the cartridge case from its seat, with an ejector secured in said receiver and projecting into a groove in the breech block on its opposite side from the extractor, and adapted to strike the rim of the cartridge case as the breech block is drawn rearward, substantially as described.

16. In an automatic gun, the combination with a reciprocating motor piston and breech mechanism operated thereby, of feed mechanism also operated by the motor piston and adapted to hold the motor piston in the rearward position and to automatically release the same when a feed strip is inserted, said feed mechanism comprising a pivoted feed piece having arms engaging said motor piston, and provided with a claw adapted to impart a step by step motion to the feed strip, substantially as described.

17. In an automatic gun, the combination with a reciprocating motor piston and breech mechanism operated thereby, of feed mechanism also operated by the motor piston and adapted to hold the motor piston in the rearward position and to automatically release the same when a feed strip is inserted, said feed mechanism comprising a pivoted feed piece having arms engaging said motor piston, and provided with a claw adapted to impart a step by step motion to the feed strip, with a spring normally pressing said feed piece down to the position for holding the motor piston in the rear, but yielding when a feed strip is inserted, substantially as described.

18. In an automatic gun, the combination with a gun barrel and a receiver, of means for detachably connecting said gun barrel to said receiver, a shoulder piece carrying a stock detachably connected to said receiver, breech mechanism mounted in said receiver, firing mechanism mounted in said shoulder piece, a motor piston vibrating in said receiver and actuating the breech mechanism, and feed mechanism removably mounted in said receiver, with a perforated casing composed of two parts hinged to said receiver and detachably mounted on the gun barrel in front of said receiver and inclosing the forward end of the motor piston, with a transverse bolt located beneath the barrel and tying the two hinged parts together, substantially as described.

19. In an automatic gun, the combination with a gun barrel and a receiver, of means for detachably connecting said gun barrel to said receiver, a shoulder piece carrying a stock detachably connected to said receiver, breech mechanism mounted in said receiver, firing mechanism mounted in said shoulder piece, a motor piston vibrating in said receiver and actuating the breech mechanism, feed mechanism removably mounted in said receiver, with a perforated casing composed of two parts detachably mounted on the gun barrel in front of said reservoir and inclosing the forward end of the motor piston, supporting legs pivoted to the gun barrel, and a tie bolt for said perforated casing serving to hold the casing in place and provided with forked ends to hold the supporting legs when not in use, substantially as described.

20. In a gun of the character described provided with a motor piston, the combination with two supporting legs pivoted to the barrel, of a perforated casing made of two parts mounted over the gun barrel in rear of said legs and inclosing the forward end of the motor piston, and a tie bolt for said casing provided with forked ends adapted to hold the supporting legs when not in use, substantially as described.

21. In a gun of the character described provided with a motor piston, the combination with two supporting legs pivoted to the barrel, of a perforated casing made of two parts mounted over the gun barrel in rear of said legs and inclosing the forward end of the motor piston, and a tie bolt for said casing provided with forked ends with springs in the forks adapted to hold the supporting legs when not in use, substantially as described.

22. In an automatic gun, the combination with a motor piston and a spring for returning the same to the initial position, of a rigid cocking piece projecting forward into said motor piston and provided with a hook adapted to engage the motor piston and to draw the same to the rear against the action of said spring, and means for cocking said motor piston in the rearward position and for releasing same by hand when desired, substantially as described.

23. In an automatic gun, the combination with a motor piston and a spring for returning the same to the initial position, of a rigid cocking piece projecting forward into said motor piston and provided with a hook adapted to engage the motor piston and to draw the same to the rear against the action of said spring, and means for cocking said motor piston in the rearward position and for releasing same by hand when desired, comprising a spring impressed sear, and a spring impressed trigger piece, with means actuated by said trigger piece for withdrawing said sear out of engagement with the motor piston, substantially as described.

24. In an automatic gun, the combination with a motor piston and a spring for returning the same to the initial position, of a cocking piece projecting forward into said motor piston and provided with a hook adapted to engage the motor piston and to draw the same to the rear against the action of said spring, the said cocking piece being provided with a flanged head cut away along a limited portion of its periphery, and means for cocking said motor piston in the rearward position and for releasing same by hand when desired, comprising a sear normally engaging said motor piston, a sliding trigger piece adapted to withdraw said sear from engagement with the motor piston, and having a tail piece adapted to strike against the periphery of the head of the cocking piece, but to pass under said cut away portions, substantially as described.

25. In an automatic gun, the combination with a motor piston and a spring for returning the same to the initial position, of a cocking piece projecting forward into said motor piston and provided with a hook adapted to engage the motor piston and to draw the same to the rear against the action of said spring, the said cocking piece being provided with a flanged head cut away along a limited portion of its periphery, means for cocking said motor piston in the rearward position and for releasing same by hand when desired, comprising a sear normally engaging said motor piston, a sliding trigger piece adapted to withdraw said sear from engagement with the motor piston, and having a tail piece adapted to strike against the periphery of the head of the cocking piece, but to pass under said cut away portions, and a spring under tension connecting said sear and said trigger piece and adapted to normally hold said sear in the cocking position and the trigger piece in the forward position, substantially as described.

26. A feed mechanism for use in automatic guns of the character described, comprising a pivoted feed piece provided with a plurality of arms rigid therewith, one of said arms bearing a claw adapted to engage the feed strip, of a motor piston provided with cams adapted to engage two of said arms and to rock said feed piece causing it to impart a step by step motion to the feed strip, substantially as described.

27. A feed mechanism for use in automatic guns of the character described, comprising a pivoted feed piece provided with a plurality of arms, one of said arms bearing a claw adapted to engage the feed strip, of a motor piston provided with cams adapted to engage two of said arms and to rock said feed piece causing it to impart a step by step motion to the feed strip, and also provided with a shoulder adapted to engage one of said arms and lock the said motor piston in the rearward position when a feed strip is not in the gun, substantially as described.

28. A feed mechanism for use in automatic guns of the character described, comprising a pivoted vertically movable feed piece provided with a plurality of arms, one of said arms bearing a claw adapted to engage the feed strip, of a motor piston provided with cams adapted to engage two of said arms and to rock said feed piece causing it to impart a step by step motion to the feed strip, and also provided with a shoulder adapted to engage one of the arms of the feed piece when the latter is in the lower position, substantially as described.

29. A feed mechanism for use in automatic guns of the character described, comprising a pivoted vertically movable feed piece provided with a plurality of arms, one of said arms bearing a claw adapted to engage the feed strip, of a motor piston provided with cams adapted to engage two of said arms and to rock said feed piece causing it to impart a step by step motion to the feed strip, and also provided with a shoulder adapted to engage one of the arms of the feed piece when the latter is in the lower position, and a spring normally pressing said feed piece downwards but permitting the same to be lifted by the insertion of a feed strip, substantially as described.

30. A feed mechanism for use in automatic guns of the character described, comprising a pivoted vertically movable feed piece provided with a plurality of arms, one of said arms bearing a claw adapted to engage the feed strip, a motor piston provided with cams adapted to engage two of said arms and to rock said feed piece causing it to impart a step by step motion to the feed strip, and also provided with a shoulder adapted to engage one of the arms of the feed piece when the latter is in the lower position, and a spring normally pressing said feed piece downwards but permitting the same to be lifted by the insertion of a feed strip, with a wedge shaped claw on said spring, adapted to engage the feed strip and lock it against back lash, substantially as described:

31. In an automatic gun, the combination with a receiver provided with guides for the feed strip, and a horn adapted to tear the cartridges loose from said strip, of a pivoted feed piece provided with a plurality of arms, one of said arms bearing a claw adapted to engage the feed strip, and a motor piston provided with cams adapted to engage two of said arms and to rock said feed piece causing it to impart a step by step motion to the feed strip, and also provided with a shoulder adapted to engage one of said arms and lock the said motor piston in the rearward position when a feed strip is not in the gun, substantially as described.

32. In an automatic gun, the combination with a receiver provided with guides for the feed strip and a horn adapted to tear the cartridges loose from said strip, of a pivoted vertically movable feed piece provided with a feeding arm bearing a claw adapted to engage the feed strip, and a motor piston provided with cams adapted to rock said feed piece causing it to impart a step by step motion to the feed strip, and also provided with a shoulder adapted to engage the feed piece, and arrest the motor piston when the feed piece is in the lower position, substantially as described.

33. In an automatic gun, the combination with a receiver provided with guides for the feed strip and a horn adapted to tear the cartridges loose from said strip, of a pivoted vertically movable feed piece provided with a plurality of arms, one of said arms bearing a claw adapted to engage the feed strip, a motor piston provided with cams adapted to engage two of said arms and to rock said feed piece causing it to impart a step by step motion to the feed strip, and also provided with a shoulder adapted to engage one of the arms of the feed piece when the latter is in the lower position, and a leaf spring normally pressing said feed piece downwards but permitting the same to be lifted by the insertion of a feed strip, substantially as described.

34. In an automatic gun, the combination with a receiver provided with guides for the feed strip, and a horn adapted to tear the cartridges loose from said strip, of a pivoted vertically movable feed piece provided with a plurality of arms, one of said arms bearing a claw adapted to engage the feed strip, a motor piston provided with cams adapted to engage two of said arms and to rock said feed piece causing it to impart a step by step motion to the feed strip, and also provided with a shoulder adapted to engage one of the arms of the feed piece when the latter is in the lower position, and a leaf spring normally pressing said feed piece downwards but permitting the same to be lifted by the insertion of a feed strip, with a wedge shaped claw made integral with said spring and adapted to engage the feed strip and lock it against back lash, substantially as described.

35. In a gun, the combination with a gun barrel and a receiver rigidly secured thereto, of a reciprocating breech block provided with interrupted screw threads, and mounted in said receiver, a breech nut revolubly mounted in said receiver in rear of said barrel but held against longitudinal motion, said breech nut being provided with interrupted screw threads registering with those of the breech block, and means for rotating said breech nut to cause its threads to engage and disengage with those of the breech block, substantially as described.

36. In a gun, the combination with a gun barrel and a receiver rigidly secured thereto, of a reciprocating breech block provided with interrupted screw threads, and mounted in said receiver, a breech nut revolubly mounted in said receiver in rear of said barrel but held against longitudinal motion, said breech nut being provided with interrupted screw threads registering with those of the breech block, and automatic means for rotating said breech nut to cause its threads to engage and disengage with those of the breech block, substantially as described.

37. In a gun, the combination with a gun barrel and a receiver, rigidly secured thereto, of a reciprocating breech block provided with interrupted screw threads, and mounted in said receiver, a breech nut revolubly mounted in said receiver in rear of said barrel but held against longitudinal motion, said breech nut being provided with interrupted screw threads registering with those of the breech block, and automatic means for rotating said breech nut to cause its threads to engage and disengage with those of the breech block, comprising a motor piston and a cam engagement between said motor piston and said breech nut, substantially as described.

38. In a gun, the combination with a gun barrel and a receiver rigidly secured thereto, of a reciprocating breech block provided with interrupted screw threads, and mounted in said receiver, a breech nut revolubly mounted in said receiver in rear of said barrel but held against longitudinal motion, said nut being provided with interrupted screw threads registering with those of the breech block, and a reciprocating motor piston connected to said breech block and engaging said breech nut for rotating same, substantially as described.

39. In an automatic gun, the combination with a gun barrel and a longitudinally movable breech block provided with interrupted screw threads, of a breech nut revolubly mounted in rear of said barrel but held against longitudinal motion, said breech nut being provided with interrupted screw threads registering with those of the breech block, and a reciprocating motor piston connected to said breech block and engaging said breech nut for rotating same, with a resilient extractor carried by said reciprocating breech block, and a cam engagement between said extractor and said breech nut when the latter is rotated to the locked position, substantially as described.

40. In an automatic gun, the combination with a gun barrel and a longitudinally movable breech block provided with interrupted screw threads, of a breech nut revolubly mounted in rear of said barrel but held against longitudinal motion, said breech nut being provided with interrupted screw threads registering with those of the breech block, a reciprocating motor piston connected to said breech block and engaging said breech nut for rotating same, with a resilient extractor carried by said reciprocating breech block, a cam engagement between said extractor and said breech nut when the latter is rotated to the locked position, and an ejector projecting into a groove in said breech block and engaging the head of the cartridge case when the breech block is drawn rearward, substantially as described.

41. In an automatic gun, the combination with a gun barrel and a receiver rigidly secured thereto, and a reciprocating hollow breech block mounted in said receiver and provided with interrupted screw threads and a lateral groove, of a breech nut revolubly mounted in rear of said barrel, but held against longitudinal motion, said breech nut being provided with interrupted screw threads registering with those of the breech block, a firing pin revolubly mounted in said breech block and having a limited longitudinal movement therein and being provided with a laterally projecting lug, a motor piston having a lug projecting upward into said breech block, and having a limited longitudinal play therein, and engaging said firing pin, a cam engagement between said motor piston and said breech nut for rotating the latter to the locking position relative to said breech block, and a cam groove in the receiver engaging said lug on the firing pin and rotating the latter into the lateral groove of the breech block for locking the breech block to the motor piston, substantially as described.

42. In an automatic gun, the combination with a gun barrel and a receiver rigidly secured thereto, and a reciprocating hollow breech block mounted in said receiver and provided with interrupted screw threads and a lateral groove, of a breech nut revolubly mounted in rear of said barrel, but held against longitudinal motion, said breech nut being provided with interrupted screw threads registering with those of the breech block, a firing pin revolubly mounted in said breech block and having a limited longitudinal movement therein and being provided with a laterally projecting lug, a motor piston having a lug projecting upward into said breech block, and having a limited longitudinal play therein, and engaging said firing pin, a cam engagement between said motor piston and said breech nut for rotating the latter to the locking position relative to said breech block, and a cam groove in the receiver engaging said lug on the firing pin and rotating the latter into the lateral groove of the breech block for locking the breech block to the motor piston, an extractor carried by the breech block, and means operated by the rotation of the breech nut for holding the claw of said extractor firmly in engagement with the rim of the cartridge case during the early part of the breech opening motion, substantially as described.

43. In an automatic gun, the combination with a gun barrel and a receiver rigidly secured thereto, and a reciprocating hollow breech block mounted in said receiver and provided with interrupted screw threads, and a lateral groove, of a breech nut revolubly mounted in rear of said barrel, but held against longitudinal motion, said breech nut being provided with interrupted screw threads registering with those of the breech block, a firing pin revolubly mounted in said breech block and having a limited longitudinal movement therein and being provided with a laterally projecting lug, a motor piston having a lug projecting upward into said breech block, and having a limited longitudinal play therein, and engaging said firing pin, a cam engagement between said motor piston and said breech nut for rotating the latter to the locking position relative to said breech block, and a cam groove in the receiver engaging said lug on the firing pin and rotating the latter into the lateral groove of the breech block for locking the breech block to the motor piston, an extractor carried by the breech block, and a cam engagement between the head of the extractor and the interior of the breech nut, operated by the rotation of the breech nut for holding the claw of said extractor firmly in engagement with the rim of the cartridge case during the early part of the breech opening motion, substantially as described.

44. In an automatic gun, the combination with a gun barrel and a receiver rigidly secured thereto, and a reciprocating hollow breech block mounted in said receiver and provided with interrupted screw threads and a lateral groove, of a breech nut revolubly mounted in rear of said barrel, but held against longitudinal motion, said breech nut being provided with interrupted screw threads registering with those of the breech block, a firing pin revolubly mounted in said breech block and having a limited longitudinal movement therein and being provided with a laterally projecting lug, a motor piston having a lug projecting upward into said breech block, and having a limited longitudinal play therein, and engaging said firing pin, a cam engagement between said motor piston and said breech nut for rotating the latter to the locking position relative to said breech block, and a cam groove in the receiver engaging said lug on the firing pin and rotating the latter into the lateral groove of the breech block for locking the breech block to the motor piston, an extractor carried by the breech block, and means operated by the rotation of the breech nut for holding the claw of said extractor firmly in engagement with the rim of the cartridge case during the early part of the breech opening motion, and an ejector comprising a fixed tongue secured in the receiver and projecting into a groove in the side of the breech block, and engaging with the rim of the cartridge case as the breech block is drawn rearward, substantially as described.

45. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating breech block provided with interrupted screw threads registering with those of the breech nut and connected to said motor piston, with automatic means for locking the breech block to the motor piston when the breech block is disengaged from the breech nut, substantially as described.

46. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating hollow breech block provided with interrupted screw threads registering with those of the breech nut, a firing pin revolubly connected to the motor piston, but reciprocating therewith and projecting forward through said hollow breech block, with means for locking said firing pin to the breech block and for unlocking same during a pre-determined part of the movement of the motor piston, and an extractor carried by the breech block, substantially as described.

47. In an automatic gun, the combination with the gun barrel and receiver, and means for rigidly securing the gun barrel to the receiver, of a breech nut revolubly mounted in said receiver and held against longitudinal motion in rear of said barrel, said breech nut being slotted along its rear portion and provided with interrupted screw threads, a reciprocating motor piston, a cam engagement between said motor piston and said breech nut for rotating the nut, a reciprocating breech block provided with interrupted screw threads registering with those of the breech nut, with automatic means for locking the breech block to the motor piston when the breech block is disengaged from the breech nut, a resilient extractor carried by said breech block, and a cam engagement between said extractor and said breech nut for binding the claw of the extractor firmly over the rim of the cartridge case during the period of starting the cartridge case from its seat, substantially as described.

48. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston, a cam engagement between said motor piston and said breech nut for rotating the nut, a reciprocating hollow breech block provided with interrupted screw threads registering with those of the breech nut, a firing pin revolubly connected to the motor piston, but reciprocating therewith and projecting forward through said hollow breech block, with means for locking said firing pin to the breech block and for unlocking same, during a predetermined part of the movement of the motor piston, a resilient extractor carried by said breech block, and a cam engagement between said extractor and said breech nut for binding the claw of the extractor firmly over the rim of the cartridge case during the period of starting the cartridge case from its seat, substantially as described.

49. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston, a cam engagement between said motor piston and said breech nut for rotating the nut, a reciprocating hollow breech block provided with interrupted screw threads registering with those of the breech nut, a firing pin revolubly connected to the motor piston, but reciprocating therewith and projecting forward through said hollow breech block, with means for locking said firing pin to the breech block and for unlocking same during a predetermined part of the movement of the motor piston, a resilient extractor carried by said breech block, and a cam engagement between said extractor and said breech nut for binding the claw of the extractor firmly over the rim of the cartridge case during the period of starting the cartridge case from its seat, with an ejector secured in said receiver and projecting into a groove in the breech block on its opposite side from the extractor, and adapted to strike the rim of the cartridge case as the breech block is drawn rearward, substantially as described.

50. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston, a cam engagement between said motor piston and said breech nut for rotating the nut, a reciprocating hollow breech block provided with interrupted screw threads registering with those of the breech nut and with a lateral groove, a firing pin revolubly connected to the motor piston, but reciprocating therewith, and projecting forward through said hollow breech block, said firing pin being provided with a lateral lug, a cam groove in the receiver adapted to engage said lug, for locking said firing pin to the breech block and for unlocking same during a predetermined part of the movement of the motor piston, and an extractor carried by said breech block, substantially as described.

51. In an automatic gun, the combination with a gun barrel and a receiver, a nut detachably connecting said gun barrel to said receiver, a shoulder piece carrying a stock detachably connected to said receiver, breech mechanism mounted in said receiver, firing mechanism mounted in said shoulder piece, a motor piston vibrating in said receiver and actuating the breech mechanism, feed mechanism mounted in said receiver, with a perforated casing composed of two parts detachably mounted on the gun barrel in front of said receiver and inclosing the forward end of the motor piston, supporting legs pivoted to the gun barrel, and a tie bolt for said perforated casing serving to hold the casing in place and provided with forked ends to hold the supporting legs when not in use, substantially as described.

52. In a gun of the characted described provided with a motor piston, the combination with the gun barrel and receiver, of two supporting legs pivoted to the barrel, a perforated casing made of two parts hinged to the receiver and mounted over the gun barrel in rear of said legs and inclosing the forward end of the motor piston, and a tie bolt for said casing provided with forked ends adapted to hold the supporting legs when not in use, substantially as described.

53. In a gun of the character described provided with a motor piston, the combination with the gun barrel and receiver, of two supporting legs pivoted to the barrel, a perforated casing made of two parts hinged to the receiver and mounted over the gun barrel in rear of said legs and inclosing the forward end of the motor piston, and a tie bolt for said casing provided with forked ends with springs in the forks adapted to hold the supporting legs when not in use, substantially as described.

54. In an automatic gun, the combination with a motor piston and a spring for returning the same to the initial position, of a rigid cocking piece projecting forward into said motor piston and provided with a hook adapted to engage the motor piston and to draw the same to the rear against the action of said spring, automatic means for cocking said motor piston in the rearward position, and means for releasing same by hand when desired, substantially as described.

55. In an automatic gun, the combination with a motor piston and a spring for returning the same to the initial position, of a rigid cocking piece projecting forward into said motor piston and provided with a hook adapted to engage the motor piston and to draw the same to the rear against the action of said spring, and means for cocking said motor piston in the rearward position and for releasing same by hand when desired, comprising a spring impressed cocking toe, and a spring impressed trigger piece, with means actuated by said trigger piece for rocking said toe out of engagement with the motor piston, substantially as described.

56. In an automatic gun, the combination with a motor piston and a spring for returning the same to the initial position, of a cocking piece projecting forward into said motor piston and provided with a hook adapted to engage the motor piston and to draw the same to the rear against the action of said spring, the said cocking piece being provided with a flanged head cut away along a limited portion of its periphery, and means for cocking said motor piston in the rearward position and for releasing same by hand when desired, comprising a sear normally engaging said motor piston, a sliding trigger piece adapted to withdraw said sear from engagement with the motor piston, and having a tail piece adapted to strike against the periphery of the head of the cocking piece, but to pass under said cut away portions, with means for locking said cocking piece in any desired position, substantially as described.

57. In an automatic gun, the combination with a motor piston and a spring for returning the same to the initial position, of a cocking piece projecting forward into said motor piston and provided with a hook adapted to engage the motor piston and to draw the same to the rear against the action of said spring, the said cocking piece being provided with a flanged head cut away along a limited portion of its periphery, means for cocking said motor piston in the rearward position and for releasing same by hand when desired, comprising a sear normally engaging said motor piston, a sliding trigger piece adapted to withdraw said sear from engagement with the motor piston, and having a tail piece adapted to strike against the periphery of the head of the cocking piece, but to pass under said cut away portions, and a spring under tension connecting said sear and said trigger piece to normally hold said sear in the cocking position and the trigger piece in the forward position, with means for locking said cocking piece in any desired position, substantially as described.

58. In a gas operated gun provided with a breech casing having a guide-way, the combination with a reciprocating motor piston and a spring for returning same to the initial position, said piston being provided with a cocking notch, of a rotary sear provided with a cocking toe adapted to engage said notch and with a cocking arm, and a sliding trigger piece provided with a hook engaging said cocking arm and sliding in said guide-way, and a spring under tension connecting said sear and said trigger piece and normally tending to hold said cocking toe in the engaging position and to hold said hook in engagement with said cocking arm, substantially as described.

59. In a gas operated gun, the combination with a reciprocating motor piston and a spring for returning the same to the initial position, said piston being provided with a cocking notch, of a rotary sear provided with a cocking toe adapted to engage said notch and with a cocking arm, a sliding trigger piece provided with a hook engaging said cocking arm and with a wedge-shaped tail piece, and a transverse disk cut away in portions thereof and adapted to arrest the rearward movement of the trigger piece except when the tail-piece thereof coincides with one of the cut-away portions of said disk, substantially as described.

60. In a gas operated gun, the combination with a reciprocating motor piston and a spring for returning same to the initial position, said piston being provided with a cocking notch, of a rotary sear provided with a cocking toe adapted to engage said notch and with a cocking arm, a sliding trigger piece having a hook adapted to engage said cocking arm and a wedge-shaped tail-piece, and a disk cut away in portions thereof and adapted to arrest the rearward movement of the trigger-piece except when the tail-piece thereof coincides with one of the cut away portions of said disk, with a spring under tension connecting said sear and said trigger piece and normally tending to hold said cocking toe in the engaging position and to hold said hook in engagement with said cocking arm, substantially as described.

61. In a gas operated gun, the combination with a reciprocating motor piston and a spring for returning the same to the initial position, said piston being provided with a cocking notch, of a rotary sear provided with a cocking toe adapted to engage said notch and with a cocking arm, a sliding trigger piece provided with a hook engaging said cocking arm and with a wedge-shaped tail-piece, and a transverse disk cut away in portions thereof and adapted to arrest the rearward movement of the trigger-piece except when the tail-piece thereof coincides with one of the cut-away portions of said disk, with means for locking said disk at any one of a plurality of positions, substantially as described.

62. In a gas operated gun, the combination with a reciprocating motor piston and a spring for returning same to the initial position, said piston being provided with a cocking notch, of a rotary sear provided with a cocking toe adapted to engage said notch and with a cocking arm, a sliding trigger-piece having a hook adapted to engage said cocking arm and a wedge-shaped tail-piece, and a disk cut away in portions thereof and adapted to arrest the rearward movement of the trigger-piece except when the tail-piece thereof coincides with one of the cut away portions of said disk, with a spring under tension connecting said sear and said trigger-piece and normally tending to hold said cocking toe in the engaging position and to hold said hook in engagement with said cocking arm, with means for locking said disk at any one of a plurality of positions, substantially as described.

63. In a gas operated gun, the combination with a reciprocating motor piston and a spring for returning the same to the initial position, said piston being provided with a cocking notch, of a rotary sear provided with a cocking toe adapted to engage said notch and with a cocking arm, a sliding trigger-piece adapted to work about a pivot and provided with a hook engaging said cocking arm, a sliding trigger-piece having a hook adapted to engage said cocking arm and a wedge-shaped tail-piece, and a disk cut away in portions thereof and adapted to arrest the rearward movement of the trigger-piece except when the tail-piece thereof coincides with one of the cut away portions of said disk, a fixed shoulder adapted to engage said trigger-piece when rocked about its pivot, and means for locking said disk at any one of a plurality of positions, substantially as described.

64. In a gas operated gun, the combination with a reciprocating motor piston and a spring for returning same to the initial position, said piston being provided with a cocking notch, of a rotary sear provided with a cocking toe adapted to engage said notch and with a cocking arm, a sliding trigger piece having a hook adapted to engage said cocking arm and a wedge-shaped tail-piece, and a disk cut away in portions thereof and adapted to arrest the rearward movement of the trigger-piece except when the tail-piece thereof coincides with one of the cut away portions of said disk, with a spring under tension connecting said sear and said trigger piece and normally tending to hold said cocking toe in the engaging position and to hold said hook in engagement with said cocking arm, with means for locking said disk at any one of a plurality of positions, substantially as described.

65. In a gas operated gun provided with a breech casing having a guide-way, the combination with a reciprocating motor piston and a spring for returning same to the initial position, said piston being provided with a cocking notch, of a rotary sear provided with a cocking toe adapted to engage said notch and with a cocking arm, and a sliding trigger piece adapted to rock slightly in its seat and provided with a hook engaging said cocking arm and sliding in said guide-way, with a spring under tension connecting said sear and said trigger piece and normally tending to hold said cocking toe in the engaging position and to hold said hook in engagement with said cocking arm, with means for locking said trigger piece against rearward motion when desired, substantially as described.

66. In a gas operated gun, the combination with a reciprocating motor piston and a spring for returning the same to the initial position, said piston being provided with a cocking notch, of a rotary sear provided with a cocking toe adapted to engage said notch and with a cocking arm, a sliding trigger piece adapted to rock slightly in its seat and provided with a hook engaging said cocking arm and with a wedge shaped tail piece, and a transverse disk cut away in portions thereof and adapted to arrest the rearward movement of the trigger piece except when the tail-piece thereof coincides with one of the cut-away portions of said disk, with means for locking said trigger piece against rearward motion when desired, substantially as described.

67. In a gas operated gun, the combination with a reciprocating motor piston and a spring for returning same to the initial position, said piston being provided with a cocking notch, of a rotary sear provided with a cocking toe adapted to engage said notch and with a cocking arm, a sliding trigger piece adapted to rock slightly in its seat and having a hook adapted to engage said cocking arm and a wedge-shaped tail-piece, and a disk cut away in portions of the periphery thereof and adapted to arrest the rearward movement of the trigger piece except when the tail-piece thereof coincides with one of the cut away portions of said disk, with a spring under tension connecting said sear and said trigger piece and normally tending to hold said cocking toe in the engaging position and to hold said hook in engagement with said cocking arm, substantially as described.

68. In a gas operated gun, the combination with a reciprocating motor piston and a spring for returning the same to the initial position, said piston being provided with a cocking notch, of a rotary sear provided with a cocking toe adapted to engage said notch and with a cocking arm, a sliding trigger-piece adapted to rock slightly in its seat and provided with a hook engaging said cocking arm and with a wedge-shaped tail-piece, and a transverse disk cut away in portions of the periphery thereof and adapted to arrest the rearward movement of the trigger-piece except when the tail-piece thereof coincides with one of the cut-away portions of said disk, with means for locking said disk at any one of a plurality of positions, substantially as described.

69. In a gas operated gun, the combination with a reciprocating motor piston and a spring for returning same to the initial position, said piston being provided with a cocking notch, of a rotary sear provided with a cocking toe adapted to engage said notch and with a cocking arm, a sliding trigger piece adapted to rock slightly in its seat and having a hook adapted to engage said cocking arm and a wedge-shaped tail-piece, and disk cut way in portions of the periphery thereof and adapted to arrest the rearward movement of the trigger-piece except when the tail-piece thereof coincides with one of the cut away portions of said disk, with a spring under tension connecting said sear and said trigger-piece and normally tending to hold said cocking toe in the engaging position and to hold said hook in engagement with said cocking arm, with means for locking said disk at any one of a plurality of positions, substantially as described.

70. In a gas operated gun, the combination with a reciprocating motor piston and a spring for returning the same to the initial position, said piston being provided with a cocking notch, of a rotary sear provided with a cocking toe adapted to engage said notch and with a cocking arm, a sliding trigger-piece adapted to work about a pivot and provided with a hook engaging said cocking arm, a sliding trigger-piece adapted to rock slightly in its seat and having a hook adapted to engage said cocking arm and a wedge-shaped tail-piece, and a disk cut away in portions of the periphery thereof and adapted to arrest the rearward movement of the trigger-piece except when the tail-piece thereof coincides with one of the cut away portions of said disk, a fixed shoulder adapted to engage said trigger piece when rocked about its pivot, and means for locking said disk at any one of a plurality of positions, substantially as described.

71. In a gas operated gun, the combination with a reciprocating hollow motor piston and a spring for returning same to the initial position, said piston being provided with a cocking notch, of a rotary sear provided with a cocking toe adapted to engage said notch and with a cocking arm, a sliding trigger piece having a hook adapted to engage said cocking arm and a wedge-shaped tail-piece, and a cocking piece projecting forward into said hollow piston and terminating at the rear in a disk cut away in portions thereof and adapted to arrest the rearward movement of the trigger-piece except when the tail-piece thereof coincides with one of the cut away portions of said disk, with a spring under tension connecting said sear and said trigger piece and normally tending to hold said cocking toe in the engaging position and to hold said hook in engagement with said cocking arm, with means for locking said disk at any one of a plurality of positions, substantially as described.

72. In a gas operated gun, the combination with a reciprocating motor piston and a spring for returning same to the initial position, said piston being provided with a cocking notch, of a rotary sear provided with a cocking toe adapted to engage said notch and with a cocking arm, and a sliding trigger piece adapted to rock slightly in its seat and provided with a hook engaging said cocking arm, with a transverse disk slotted in its periphery and permitting the rearward motion of the trigger piece only when said trigger piece registers with one of said slots, substantially as described.

73. In a gas operated gun, the combination with a reciprocating motor piston and a return spring for returning same to the initial position, said piston being provided with a cocking notch, of a rotary sear provided with a cocking toe adapted to engage said notch and with a cocking arm, and a sliding trigger piece adapted to rock slightly in its seat and provided with a hook engaging said cocking arm, with a spring under tension connecting said sear and said trigger piece and normally tending to hold said cocking toe in the engaging position and to hold said hook in engagement with said cocking arm, with a disk slotted in its periphery and permitting the rearward motion of the trigger piece only when said trigger piece registers with one of said slots, substantially as described.

74. In a gas operated gun, the combination with a reciprocating motor piston and a spring for returning same to the initial position, said piston being provided with a cocking notch, of a rotary sear provided with a cocking toe adapted to engage said notch and with a cocking arm, and a sliding trigger piece adapted to rock slightly in its seat and provided with a hook engaging said cocking arm, with a disk slotted in its periphery and permitting the rearward motion of the trigger piece only when said trigger piece registers with one of said slots, with means for turning said disk, and a supporting washer pressed into engagement with said disk by said return spring, and thus locking same in the desired position, substantially as described.

75. In a gas operated gun, the combination with a reciprocating motor piston and a return spring for returning same to the initial position, said piston being provided with a cocking notch, of a rotary sear provided with a cocking toe adapted to engage said notch and with a cocking arm, and a sliding trigger piece adapted to rock slightly in its seat and provided with a hook engaging said cocking arm, with a spring under tension connecting said sear and said trigger piece and normally tending to hold said cocking toe in the engaging position and to hold said hook in engagement with said cocking arm, with a disk slotted in its periphery and permitting the rearward motion of the trigger piece only when said trigger piece registers with one of said slots, with means for turning said disk, and a supporting washer pressed into engagement with said disk by said return spring, and thus locking same in the desired position, substantially as described.

76. In a gas operated gun, the combination with a reciprocating hollow motor piston and a spring for returning the same to the initial position, said piston being provided with a cocking notch, of a rotary sear provided with a cocking toe adapted to engage said notch and with a cocking arm, a sliding trigger piece adapted to rock slightly in its seat and provided with a hook engaging said cocking arm and with a wedge-shaped tail piece, and a cocking piece projecting forward into said hollow piston and terminating at the rear in a disk cut away in portions thereof and adapted to arrest the rearward movement of the trigger piece except when the tail-piece thereof coincides with one of the cut-away portions of said disk, with means for turning said disk, and a supporting washer pressed into engagement with said disk by said return spring, and thus locking same in the desired position, substantially as described.

77. In a gas operated gun, the combination with a reciprocating hollow motor piston and a spring for returning same to the initial position, said piston being provided with a cocking notch, of a rotary sear provided with a cocking toe adapted to engage said notch and with a cocking arm, a sliding trigger piece adapted to rock slightly in its seat and having a hook adapted to engage said cocking arm and a wedge-shaped tail-piece, and a cocking piece projecting forward into said hollow piston and terminating at the rear in a disk cut away in portions of the periphery thereof and adapted to arrest the rearward movement of the trigger piece except when the tail piece thereof coincides with one of the cut away portions of said disk, a spring under tension connecting said sear and said trigger piece and normally tending to hold said cocking toe in the engaging position and to hold said hook in engagement with said cocking arm, with means for turning said disk, and a supporting washer pressed into engagement with said disk by said return spring, and thus locking same in the desired position, substantially as described.

78. In a gas operated gun, the combination with a reciprocating hollow motor piston and a spring for returning the same to the initial position, said piston being provided with a cocking notch, of a rotary sear provided with a cocking toe adapted to engage said notch and with a cocking arm, a sliding trigger-piece adapted to rock slightly in its seat and provided with a hook engaging said cocking arm and with a wedge-shaped tail-piece, and a cocking piece projecting forward into said hollow piston and terminating at the rear in a disk cut away in portions of the periphery thereof and adapted to arrest the rearward movement of the trigger piece except when the tail-piece thereof coincides with one of the cut-away portions of said disk, with means for turning said disk, and a supporting washer pressed into engagement with said disk by said return spring, and thus locking same in the desired position, substantially as described.

79. In a gas operated gun, the combination with a reciprocating hollow motor piston and a spring for returning same to the initial position, said piston being provided with a cocking notch, of a rotary sear provided with a cocking toe adapted to engage said notch and with a cocking arm, a sliding trigger piece adapted to rock slightly in its seat and having a hook adapted to engage said cocking arm and a wedge-shaped tail-piece, and a cocking piece projecting forward into said hollow piston and terminating at the rear in a disk cut away in portions of the periphery thereof and adapted to arrest the rearward movement of the trigger piece when the tail-piece thereof coincides with one of the cut away portions of said disk, with a spring under tension connecting said sear and said trigger-piece and normally tending to hold said cocking toe in the engaging position and to hold said hook in engagement with said cocking arm, with means for turning said disk, and a supporting washer pressed into engagement with said disk by said return spring, and thus locking same in the desired position, substantially as described.

80. In a gas operated gun, the combination with a reciprocating hollow motor piston and a spring for returning the same to the initial position, said piston being provided with a cocking notch, of a rotary sear provided with a cocking toe adapted to engage said notch and with a cocking arm, a sliding trigger-piece adapted to rock slightly in its seat and having a hook adapted to engage said cocking arm and a wedge-shaped tail-piece, and a cocking piece projecting forward into said hollow piston and terminating at the rear in a disk cut away in portions of the periphery thereof and adapted to arrest the rearward movement of the trigger-piece except when the tail-piece thereof coincides with one of the cut away portions of said disk, a fixed shoulder adapted to engage said trigger piece when rocked about its pivot, with means for turning said disk, and a supporting washer pressed into engagement with said disk by said return spring, and thus locking same in the desired position, substantially as described.

In testimony whereof, we affix our signature, in presence of two witnesses.

LAURENCE V. BENÉT.
HENRI A. MERCIÉ.

Witnesses:
W. A. SQUIRE,
T. A. CHOUINARD.